United States Patent
Kubo

(10) Patent No.: US 11,189,058 B2
(45) Date of Patent: Nov. 30, 2021

(54) IMAGE GENERATING DEVICE, INSPECTION APPARATUS, AND LEARNING DEVICE

(71) Applicant: ISHIDA CO., LTD., Kyoto (JP)

(72) Inventor: Takuyu Kubo, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 16/916,993

(22) Filed: Jun. 30, 2020

(65) Prior Publication Data

US 2021/0004994 A1    Jan. 7, 2021

(30) Foreign Application Priority Data

Jul. 5, 2019  (JP) .............................. JP2019-126528

(51) Int. Cl.
*G06T 11/00*  (2006.01)
*G06T 7/00*   (2017.01)

(52) U.S. Cl.
CPC ............ *G06T 11/00* (2013.01); *G06T 7/0002* (2013.01); *G06T 2207/10116* (2013.01); *G06T 2207/20081* (2013.01)

(58) Field of Classification Search
CPC ........... G06T 11/00; G06T 2207/10116; G06T 2207/20081
See application file for complete search history.

(56) References Cited

U.S. PATENT DOCUMENTS

| | | | |
|---|---|---|---|
| 9,557,436 B2 * | 1/2017 | Chen | G01V 5/005 |
| 10,977,842 B2 * | 4/2021 | Ye | G06N 3/08 |
| 2007/0019841 A1 | 1/2007 | Hirose | |
| 2009/0175526 A1 * | 7/2009 | Ramsay | G06K 9/6224 382/132 |
| 2017/0227477 A1 | 8/2017 | Sugimoto et al. | |
| 2018/0042565 A1 * | 2/2018 | Wilson | A61B 6/504 |
| 2018/0260959 A1 * | 9/2018 | Huang | G06T 7/143 |

(Continued)

FOREIGN PATENT DOCUMENTS

| | | |
|---|---|---|
| EP | 1767927 A1 | 3/2007 |
| JP | 5876116 B1 | 3/2016 |
| WO | 2006001107 A1 | 1/2006 |

OTHER PUBLICATIONS

The extended European search report dated Feb. 8, 2021.
(Continued)

*Primary Examiner* — David T Welch
(74) *Attorney, Agent, or Firm* — Global IP Counselors, LLP

(57) ABSTRACT

An image generation device comprising: an image acquiring unit configured to acquire a set of a first non-defective-product image and a second non-defective-product image for the same article to be inspected; a first processing unit configured to change a pixel value of a first target pixel that is at least one pixel forming the first non-defective-product image, thereby generating a first virtual defective-product image that is the virtual defective-product image; and a second processing unit configured to change a pixel value of a second target pixel that corresponds to the first target pixel and is at least one pixel forming the second non-defective-product image, thereby generating a second virtual defective-product image that is the virtual defective-product image.

15 Claims, 9 Drawing Sheets

(56) References Cited

U.S. PATENT DOCUMENTS

| | | | | |
|---|---|---|---|---|
| 2019/0102621 A1* | 4/2019 | Flohr | ........................ | A61B 6/482 |
| 2019/0196051 A1* | 6/2019 | Wang | ..................... | G01V 5/0016 |
| 2020/0027252 A1* | 1/2020 | Ye | ............................ | G01N 23/10 |
| 2020/0057008 A1* | 2/2020 | Suyama | ................... | G01N 23/18 |
| 2020/0309987 A1* | 10/2020 | Xu | ............................ | G01N 23/10 |
| 2020/0388042 A1* | 12/2020 | Langle | ..................... | G06T 7/292 |
| 2021/0000436 A1* | 1/2021 | Zhao | ...................... | A61B 6/5247 |

OTHER PUBLICATIONS

Rogers Thomas W et al, "A deep learning framework for the automated inspection of complex dual-energy x-ray cargo imagery", Proceedings of SPIE; [Proceedings of SPIE ISSN 0277-786X vol. 10524], SPIE, US, vol. 10187, May 1, 2017, p. 101870L, XP060089791.
Ronald P. Haff et al, "X-ray detection of defects and contaminants in the food industry", Sensing and Instrumentation for Food Quality and Safety, vol. 2, No. 4, Jun. 25, 2008, p. 262-p. 273, XP055370130.
Neethirajan et al, "Dual energy X-ray image analysis for classifying vitreousness in durum wheat", Postharvest Biology and Technology, Elsevier, Amsterdam, NL, vol. 45, No. 3, Jul. 24, 2007, p. 381-p. 384, XP022166209.

\* cited by examiner

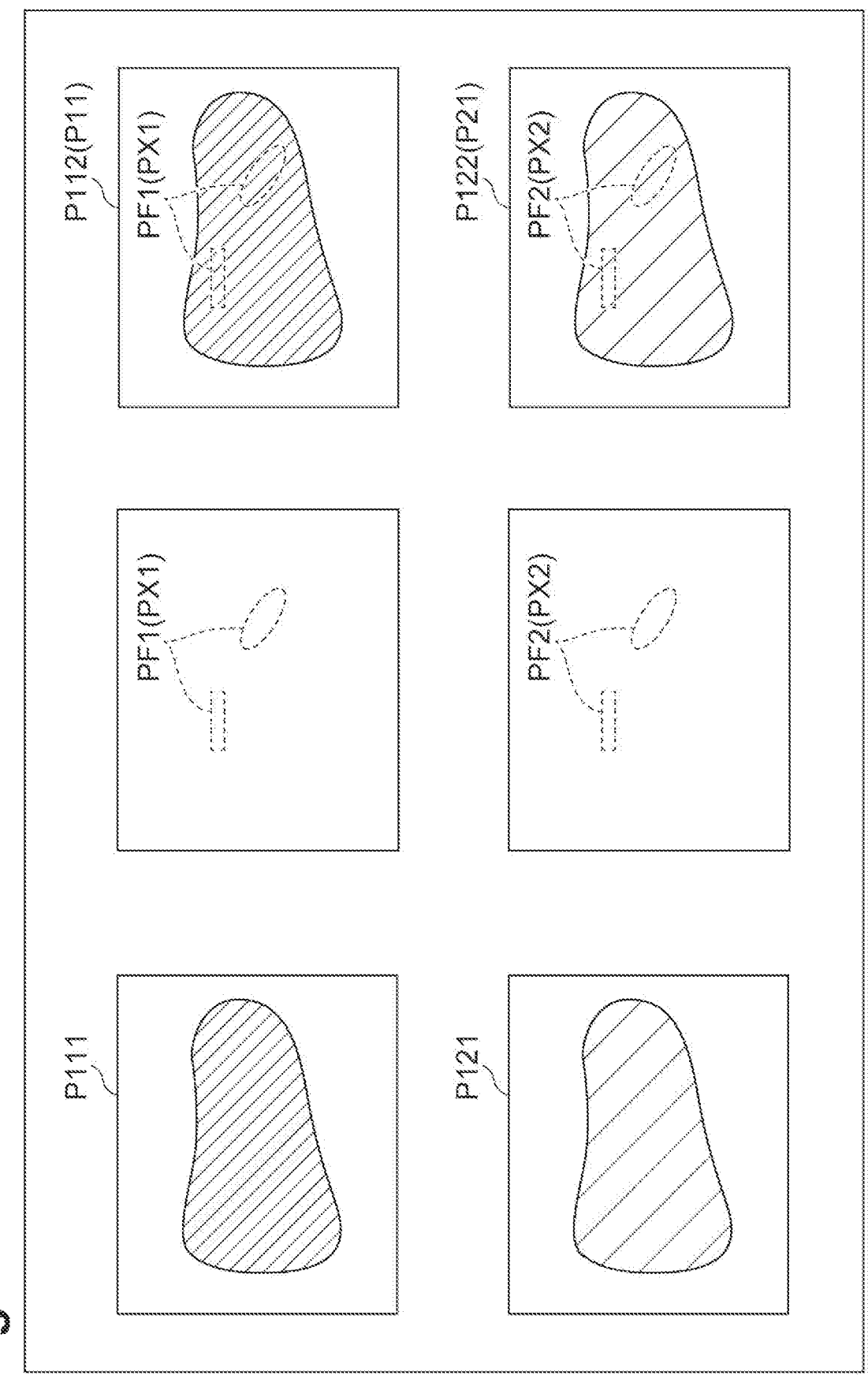

IMAGE GENERATING DEVICE, INSPECTION APPARATUS, AND LEARNING DEVICE

TECHNICAL FIELD

One aspect of the present disclosure relates to an image generating device, an inspection apparatus, and a learning device.

BACKGROUND

An inspection apparatus (X-ray inspection apparatus) configured to inspect an article on the basis of a transmission image obtained by transmitting light through the article is known. Recently, in various inspection apparatuses, many attempts to use machine learned models (learned models) generated by machine learning to perform inspection have been made, and it is also conceivable, in X-ray inspection apparatuses, to use a machine learned model to perform inspection, for example, of a foreign matter. In order to generate this machine learned model, a machine configured to generate the machine learned model needs to use a set of a defective-product image, which is an image of an article containing a foreign matter, and a label, which is data indicating the position of the foreign matter (hereinafter, also called "training data"), to perform machine learning (input the training data so as to perform the machine learning and generate the machine learned model).

It can be conceived that an image representing a virtual defective product (hereinafter, also called "virtual defective-product image"), which is generated by synthesizing (including) an image representing a virtual foreign matter recorded in advance (hereinafter, also called "virtual foreign-matter image") with a non-defective-product image containing no foreign matter, is used as such training data. A method for generating such a virtual defective-product image is described in WO 2006/001107, for example. WO 2006/001107 discloses an X-ray inspection apparatus that can select an optimum image processing algorithm to be used for image processing during inspection from a plurality of image processing algorithms, and describes use of the virtual defective-product image in processing of selecting the optimum image processing algorithm.

As such an X-ray inspection apparatus, an apparatus (inspection apparatus including a dual energy sensor) including two line sensors and configured to acquire X-ray transmission images of different energy bands with the respective line sensors and use a subtraction image of the two X-ray transmission images acquired to perform various inspections is known (e.g., Japanese Patent No. 5876116). When inspection is performed using a learned model in this inspection apparatus, it can be conceived that two types of transmission images obtained by the respective two line sensors are input to a machine learned model and a result of determining whether a foreign matter is present is output. When this machine learned model is generated, the machine learned model must be made to learn using a set of the defective-product images input by the respective two line sensors and a label indicating the position of a foreign matter as training data. Herein, it can be conceived that the above-described virtual defective-product image is used as the training data.

SUMMARY

However, even if two virtual defective-product images are generated by simply synthesizing a virtual foreign-matter image with each of the two non-defective-product images, these virtual defective-product images are images that do not reflect an absorptivity for a real electromagnetic wave, and thus there are occasions when appropriate machine learning cannot be performed.

In view of this, it is an object of one aspect of the present disclosure to provide an image generating device, an inspection apparatus, and a learning device that can generate suitable training data for performing machine learning of a machine learned model for determining whether a foreign matter is contained in an article on the basis of two types of transmission images obtained from respective two line sensors of energy bands different from each other.

An image generation device according to one aspect of the present disclosure is an image generation device configured to generate a virtual defective-product image in which a virtual foreign-matter image representing a virtual foreign matter is synthesized with a non-defective-product image based on an electromagnetic wave transmitted through an article to be inspected containing no foreign matter. The image generation device includes: an image acquiring unit configured to acquire a set of a first non-defective-product image and a second non-defective-product image for the same article to be inspected, the first non-defective-product image being the non-defective-product image based on an electromagnetic wave in a first energy band, the second non-defective-product image being the non-defective-product image based on an electromagnetic wave in a second energy band different from the first energy band; a first processing unit configured to change a pixel value of a first target pixel that is at least one pixel forming the first non-defective-product image, thereby generating a first virtual defective-product image that is the virtual defective-product image; a second processing unit configured to change a pixel value of a second target pixel that corresponds to the first target pixel and is at least one pixel forming the second non-defective-product image, thereby generating a second virtual defective-product image that is the virtual defective-product image. The first processing unit changes the pixel value of the first target pixel by first processing based on an absorptivity of the foreign matter for each electromagnetic wave, and the second processing unit changes the pixel value of the second target pixel by second processing, which is processing different from the first processing, based on the absorptivity.

Herein, the second processing unit may use, as a calculation formula (structure of the calculation formula), the same processing of the first processing unit. The second processing only needs to be processing that provides a result different from that of the first processing due to difference in internal parameter based on the absorptivity. The first processing and the second processing are set appropriately, and the pixel values of the respective images only need to be appropriately changed by the processings different from each other.

With the above-described configuration, the first processing unit and the second processing unit enable a virtual foreign-matter image to be synthesized (included) with the first non-defective-product image and the second non-defective-product image at positions corresponding to the first target pixel and the second target pixel while reflecting the absorptivities of the first energy band and the second energy band, respectively. This enables the virtual defective-product images based on the respective energies to be generated while appropriately reflecting the absorptivities of the foreign matter such that the absorbed amounts of the electromagnetic waves are different depending on the energy bands.

Specifically, if a foreign matter (e.g., a bone or a metal piece) having an absorptivity higher than that of an article to be inspected (e.g., lean meat) is to be virtually synthesized (in such an index that the gray value of a pixel increases as the transmittance of the X-ray increases), the pixel value of a pixel corresponding to the shape of a virtual foreign matter to be synthesized with the first non-defective-product image and the second non-defective-product image is set smaller (in this case, the pixel corresponding to the virtual foreign matter becomes darker because the transmission amount of the X-ray decreases). When pixel values of the article to be inspected are used as criteria, setting the magnitude of change in pixel value of the first target pixel in the first non-defective-product image to larger than the magnitude of change in pixel value of the second target pixel in the second non-defective-product image makes it possible to reflect the absorptivities of the electromagnetic waves in the actual foreign matter. If a foreign matter (e.g., a void or fatty mass) having an absorptivity lower than that of an article to be inspected (e.g., lean meat) is to be virtually synthesized (in such an index that the gray value of a pixel increases as the transmittance of the X-ray increases), the pixel value of a pixel corresponding to the shape of the virtual foreign matter to be synthesized with the first non-defective-product image and the second non-defective-product image is set larger (in this case, the pixel corresponding to the virtual foreign matter becomes brighter because the transmission amount of the X-ray is considered to increase). When pixel values of the article to be inspected are used as criteria, setting the magnitude of change in pixel value of the first target pixel in the first non-defective-product image (the absolute value of the amount of change) to smaller than the magnitude of change in pixel value of the second target pixel in the second non-defective-product image (the absolute value of the amount of change) makes it possible to reflect the absorptivities of the electromagnetic waves in the actual foreign matter.

In the image generation device according to one aspect of the present disclosure, the first processing may be processing of reducing or increasing, within a first range, the pixel value of the first target pixel with respect to a pixel value of the first non-defective-product image, the second processing may be processing of reducing or increasing, within a second range, the pixel value of the second target pixel with respect to a pixel value of the second non-defective-product image in a similar manner to the first processing, and the first range and the second range may be set to be ranges different from each other.

The expression "ranges different from each other" herein means that the first range and the second range only need to be ranges that are not completely the same, and one of the first range and the second range at least partially includes a range that does not overlap the other of the first range and the second range. The pixel value of the first non-defective-product image can be set based on the mode, the median, the mean, the maximum, or the minimum (which is a value that does not necessarily have to exactly match a statistical value such as the mean, and includes also a value that is appropriately modified, such as one-half thereof) of pixel values of pixels forming the first non-defective-product image. The pixel value of the second non-defective-product image can be set in the same manner.

In this configuration, because the processing of changing the pixel value of the target pixel is different between the first processing unit and the second processing unit, the absorptivities of the electromagnetic waves can be optimally reflected in the respective processings in the first energy band and the second energy band.

In the image generation device according to one aspect of the present disclosure, a lower limit of an absolute value in either one of the first range and the second range may be set smaller than a lower limit of an absolute value in the other of the first range and the second range, and an upper limit of an absolute value in the one of the first range and the second range may be set smaller than an upper limit of an absolute value of the other of the first range and the second range. This configuration makes it possible to optimally reflect the absorptivities of the electromagnetic waves in the respective processings in the first energy band and the second energy band because the amount of changing the pixel value of the target pixel is different between the first processing unit and the second processing unit.

In the image generation device according to one aspect of the present disclosure, at least one of the upper limit and the lower limit in one of the first range and the second range may be set based on the other of the first range and the second range. This configuration makes it possible to more appropriately set the ranges of change within which the pixel values of the first target pixel and the second target pixel are changed by the first processing unit and the second processing unit.

The image generation device according to one aspect of the present disclosure may further include: an information input unit configured to receive input of a type of the foreign matter for the virtual foreign-matter image to be synthesized with the non-defective-product image; and a storage unit configured to store therein synthesis processing information in which the type of the foreign matter to be synthesized with the non-defective-product image and at least one of the first range and the second range are associated with each other. At least one of the first processing unit and the second processing unit may acquire the first range or the second range from the synthesis processing information, based on the type of the foreign matter input in the information input unit. This configuration makes it possible to more appropriately set the ranges of change within which the pixel values of the first target pixel and the second target pixel are changed by the first processing unit and the second processing unit.

In the image generation device according to one aspect of the present disclosure, the synthesis processing information may be stored such that the type of the article to be inspected, the type of the foreign matter to be synthesized with the non-defective-product image, the first range, and the second range are associated with each other. The synthesis processing information may be formed in such a combination that a representative value of the first range is smaller than a representative value of the second range when the absorptivity of the foreign matter is lower than the absorptivity of the article to be inspected, and may be formed in such a combination that the representative value of the first range is larger than the representative value of the second range when the absorptivity of the foreign matter is higher than the absorptivity of the article to be inspected. This configuration makes it possible to optimally reflect the absorptivities of the electromagnetic waves in the respective processing in the first energy band and the second energy band. Herein, the representative values are values based on the modes, the medians, the means, the maximums, and the minimums, for example, and are each extracted by the same criterion.

An inspection apparatus according to one aspect of the present disclosure may include: an emitter configured to emit an electromagnetic wave onto an article to be inspected; a detector configured to detect an electromagnetic wave in the first energy band and an electromagnetic wave in the second energy band that are transmitted through the article to be inspected; an image generating unit configured to generate a first image of the article to be inspected based on the electromagnetic wave in the first energy band detected by the detector and also generate a second image of the article to be inspected based on the electromagnetic wave in the second energy band detected by the detector; and the above-described image generating device. The inspection apparatus thus configured can generate suitable training data for performing machine learning of a machine learned model for determining whether a foreign matter is contained in an article on the basis of two types of transmission images obtained from respective two line sensors of energy bands different from each other.

A learning device according to one aspect of the present disclosure may include a learning unit configured to perform machine learning using training data to build a learned model, the training data including the first virtual defective-product image and the second virtual defective-product image that are generated by the image generating device and correct data representing information on the first target pixel and information on the second target pixel, the learned model being configured to input an first image based on the electromagnetic wave in the first energy band transmitted through the article to be inspected having a possibility of containing the foreign matter and a second image based on the electromagnetic wave in the second energy band transmitted through the article to be inspected having the possibility of containing the foreign matter and output a foreign-matter likelihood representing a probability that the foreign matter is present for each pixel. The learning device thus configured can suitably learn when performing machine learning of the machine learned model for determining whether a foreign matter is contained in an article on the basis of two types of transmission images obtained from the respective two line sensors of energy bands different from each other.

According to one aspect of the present disclosure, it is possible to generate suitable training data for performing machine learning of the machine learned model for determining whether a foreign matter is contained in an article on the basis of two types of transmission images obtained from the respective two line sensors of energy bands different from each other.

BRIEF DESCRIPTION OF THE DRAWINGS

FIG. 5 is an explanatory diagram illustrating a method for generating virtual defective-product images.

DETAILED DESCRIPTION

An embodiment according to one aspect of the present disclosure will now be described with reference to the drawings. In the respective drawings, like or equivalent elements are designated by like numerals, and duplicate description is omitted.

Figure 1:
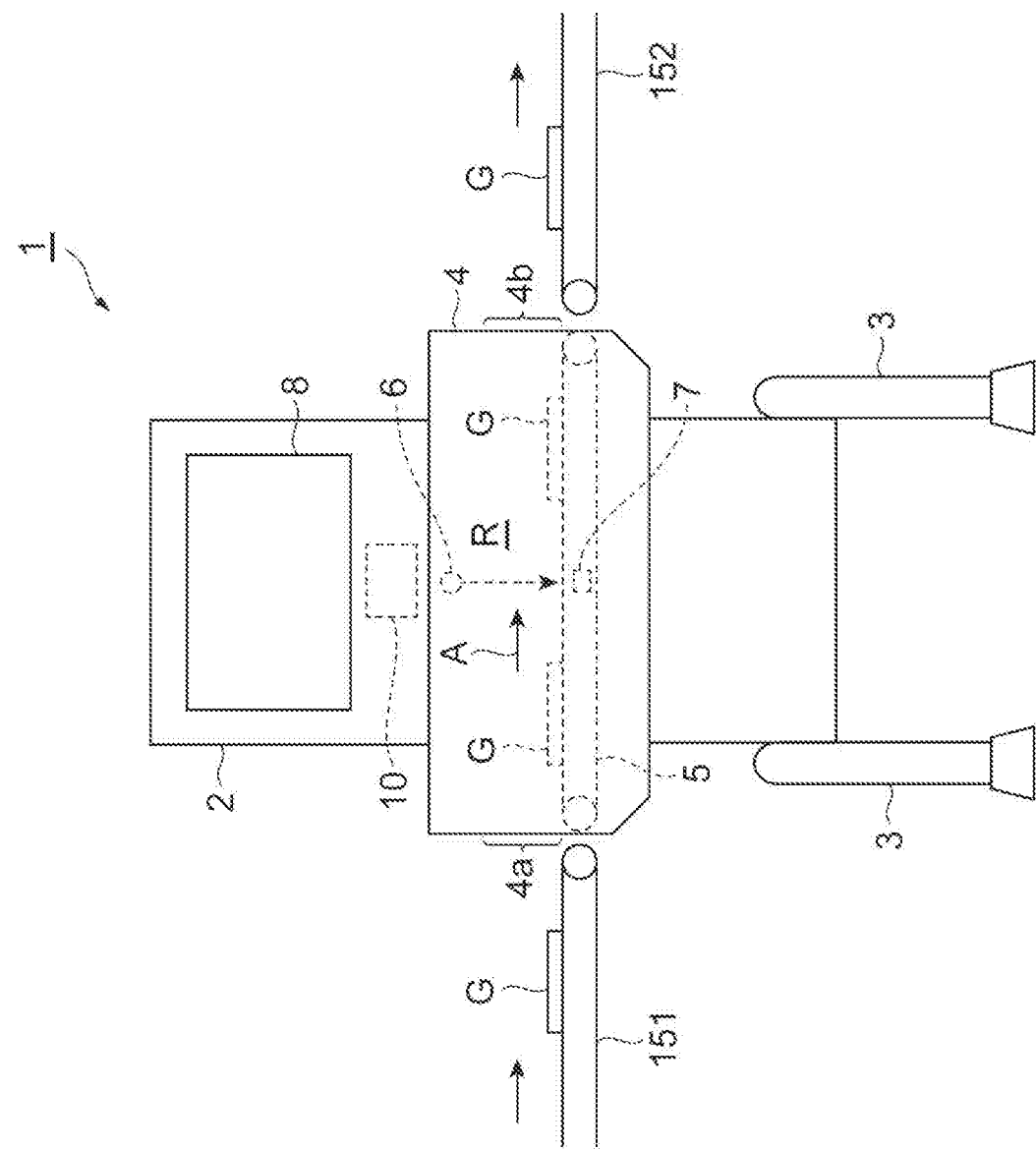
FIG. 1 is a schematic diagram of an X-ray inspection apparatus according to one embodiment.

As illustrated in FIG. 1, an X-ray inspection apparatus (inspection apparatus) 1 includes a device main body 2, support legs 3, a shield box 4, a conveyance unit 5, an X-ray emitter 6, an X-ray detector 7, a display-operation unit 8, and a controller 10. The X-ray inspection apparatus 1 generates an X-ray transmission image of an article (article to be inspected) G while conveying the article G, and conducts inspection (e.g., examination of the number of accommodated articles, foreign-matter check, missing part check, chipping and cracking check) of the article G on the basis of the X-ray transmission image. An article G before the inspection is carried into the X-ray inspection apparatus 1 by a carry-in conveyor 151. An article G after the inspection is carried out from the X-ray inspection apparatus 1 by the carry-out conveyor 152. An article G that has been determined to be a defective product by the X-ray inspection apparatus 1 is sorted outside a production line by a sorting device (not illustrated) disposed downstream of the carry-out conveyor 152. An article G that has been determined to be a non-defective-product by the X-ray inspection apparatus 1 passes through the sorting device without being processed. In the present embodiment, the articles G are pieces of meat.

The device main body 2 accommodates the controller 10, for example. The support legs 3 support the device main body 2. The shield box 4 is provided to the device main body 2. The shield box 4 prevents X-rays (electromagnetic waves) from leaking outside. Inside the shield box 4, an inspection region R where an article G is inspected with an X-ray is provided. In the shield box 4, a carry-in port 4a and a carry-out port 4b are formed. An article G before the inspection is carried from the carry-in conveyor 151 into the inspection region R through the carry-in port 4a. An article G after the inspection is carried out from the inspection region R to the carry-out conveyor 152 through the carry-out port 4b. The carry-in port 4a and the carry-out port 4b are each provided with an X-ray blocking curtain (not illustrated) for preventing X-rays from leaking.

The conveyance unit 5 is disposed in a manner passing through the center of the shield box 4. The conveyance unit 5 conveys an article G along a conveying direction A from the carry-in port 4a to the carry-out port 4b via the inspection region R. The conveyance unit 5 is, for example, a belt conveyor that runs between the carry-in port 4a and the carry-out port 4b. Herein, the belt conveyor may protrude outward from the carry-in port 4a and the carry-out port 4b.

Figure 2:
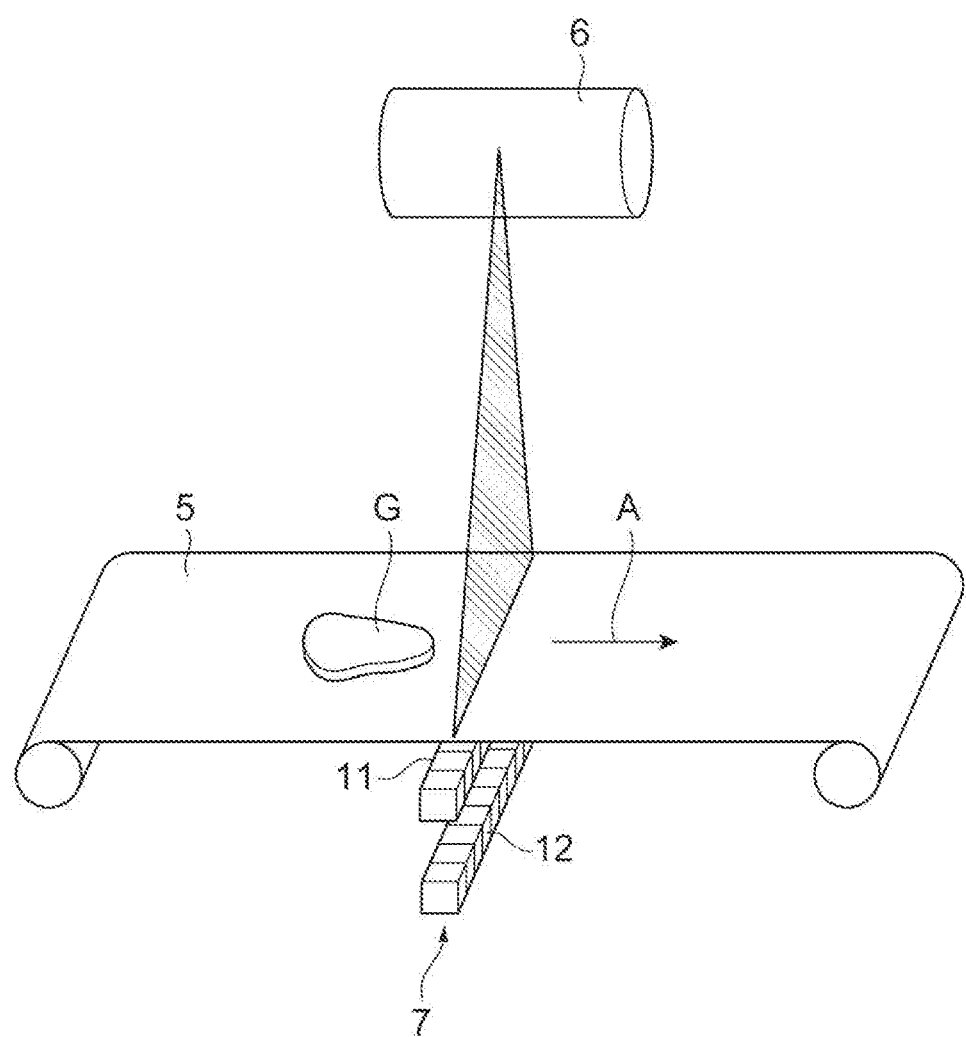
FIG. 2 is an internal view of a shield box illustrated in FIG. 1.

As illustrated in FIG. 1 and FIG. 2, the X-ray emitter 6 is disposed inside the shield box 4. The X-ray emitter 6 emits an X-ray onto the article G conveyed by the conveyance unit 5. The X-ray emitter 6 includes an X-ray tube configured to emit the X-ray and a collimator configured to widen the X-ray emitted from the X-ray tube in a fan shape in a plane perpendicular to the conveying direction A. The X-ray emitted from the X-ray emitter 6 includes X-rays in various energy bands from low energy (long wavelength) to high energy (short wavelength). Herein, the terms "low" and "high" in the low energy band and the high energy band mean "being low" and "being high" relatively in a plurality of energy bands emitted by the X-ray emitter 6, and do not indicate particular ranges.

The X-ray detector 7 is disposed inside the shield box 4. The X-ray detector 7 detects the respective X-rays in the energy bands transmitted through the article G In the present embodiment, the X-ray detector 7 is configured to detect an X-ray in a low energy band (first energy band) and an X-ray in a high energy band (second energy band). Specifically, the X-ray detector 7 includes a first line sensor 11 and a second line sensor 12. The first line sensor 11 and the second line sensor 12 each include X-ray detecting elements that are arranged linearly along a horizontal direction perpendicular to the conveying direction A. The first line sensor 11 detects an X-ray in the low energy band that has been transmitted through an article G and a conveyance belt of the conveyance unit 5. The second line sensor 12 detects an X-ray in the high energy band that has been transmitted through the article G, the conveyance belt of the conveyance unit 5, and the first line sensor 11.

As illustrated in FIG. 1, the display-operation unit 8 is provided to the device main body 2. The display-operation unit 8 displays various types of information and receives inputs of various conditions. The display-operation unit 8 is a liquid crystal display, for example, and displays an operation screen as a touch panel. In this case, an operator can input various conditions with the display-operation unit 8.

The controller 10 is disposed inside the device main body 2. The controller 10 controls operations of respective components of the X-ray inspection apparatus 1 (the conveyance unit 5, the X-ray emitter 6, the X-ray detector 7, and the display-operation unit 8, and also a sorting device (not illustrated) disposed downstream of the X-ray apparatus in the present embodiment). Herein, the sorting device is a device configured to remove, from a conveyance path, an article to be inspected (article) that has been determined to be a defective product in image inspection conducted by the X-ray inspection apparatus 1. The controller 10 includes a processor such as a central processing unit (CPU), memories such as a read only memory (ROM) and a random access memory (RAM), and a storage such as a solid state drive (SSD). The ROM stores therein a program for controlling the X-ray inspection apparatus 1. To the controller 10, a detection result of an X-ray in the low energy band is input from the first line sensor 11 of the X-ray detector 7, and also a detection result of an X-ray in the high energy band is input from the second line sensor 12 of the X-ray detector 7.

Figure 3:
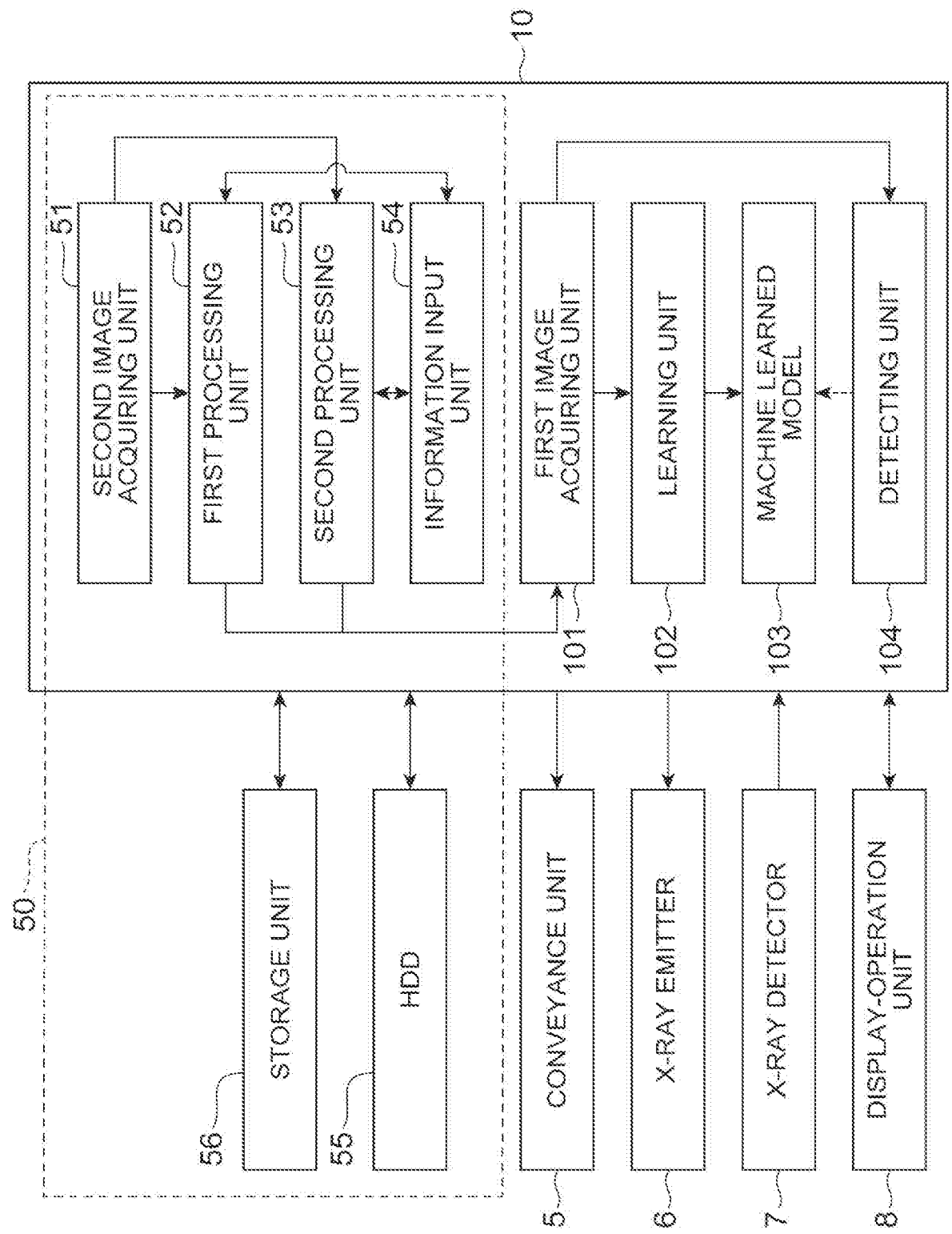
FIG. 3 is a functional block diagram of a controller.

As illustrated in FIG. 3, the controller (learning device) 10 includes a first image acquiring unit (image generating unit) 101, a learning unit 102, a machine learned model 103, and a detecting unit 104, which are implemented by reading predetermined computer software into hardware such as the CPU and the RAM, and executing the software under the control of the CPU. The machine learned model 103 is a model for predicting, based on a soft image (first image) based on an X-ray in the low energy band transmitted through an article G and a hard image (second image) based on an X-ray in the high energy band transmitted through the article G, the position of a foreign matter if the article G contains the foreign matter F. In the present embodiment, as the foreign matter F, a bone contained in an article G (meat) is mainly assumed.

The controller 10 is configured to perform both of a learning phase and an inspection phase. The learning phase is a phase of performing learning of the machine learned model 103 using training data. In other words, the learning phase is a phase of building the machine learned model 103 as a learned model by performing machine learning using training data. Examples of the machine learning used for the machine learned model 103 include a (multilayer) neural network (deep learning), a support-vector machine, and a genetic algorithm. The inspection phase is a phase of performing foreign-matter check of an article G to be inspected, using the machine learned model 103 built by the learning phase. In the present embodiment, the learning phase is performed by the first image acquiring unit 101 and the learning unit 102, and the inspection phase is performed by the first image acquiring unit 101 and the detecting unit 104.

The first image acquiring unit 101 acquires a soft image and a hard image described above. Herein, the first image acquiring unit 101 acquires the soft image and the hard image, using an image generating unit configured to make conversion based on a voltage value output from the X-ray detector 7 into an image. In the present embodiment, based on a detection result of an X-ray in a low energy band obtained by the first line sensor 11 of the X-ray detector 7, the first image acquiring unit 101 generates a soft image that is an X-ray transmission image for the low energy band. Based on a detection result of an X-ray in a high energy band obtained by the second line sensor 12 of the X-ray detector 7, the first image acquiring unit 101 generates a hard image that is an X-ray transmission image for the high energy band.

In the present embodiment, as illustrated in FIG. 2, the X-ray emitted from the X-ray emitter 6 is radiated in a fan shape, and the distance from the X-ray emitter 6 to the first line sensor 11 and the distance from the X-ray emitter 6 to the second line sensor 12 are different. Thus, the size of the article G in the soft image and the size of the article G in the hard image are different. Specifically, the article G in the hard image looks slightly larger than the article G in the soft image. In view of this, the first image acquiring unit 101 may perform processing of adjusting the scales between the soft image and the hard image on the basis of the ratio (L2/L1) between the distance (L1) from the X-ray emitter 6 to the first line sensor 11 and the distance (L2) from the X-ray emitter 6 to the second line sensor 12.

For example, the first image acquiring unit 101 may enlarge the soft image by the above-described ratio, or may reduce the hard image by the inverse (L1/L2) of the ratio. Furthermore, the first image acquiring unit 101 may perform processing of aligning the position of the article G in the soft image P10 and the position of the article G in the hard image P20 illustrated in FIG. 4A and FIG. 4B. For example, the first image acquiring unit 101 may move the soft image P10 from side to side and up and down such that difference between the soft image P10 and the hard image P20 becomes minimum. More specifically, the first image acquiring unit 101 may synthesize both images, calculate the sum of absolute values of differences in gray value of the respective pixels between both images, and align the positions such that the sum becomes minimum.

Figure 4A:
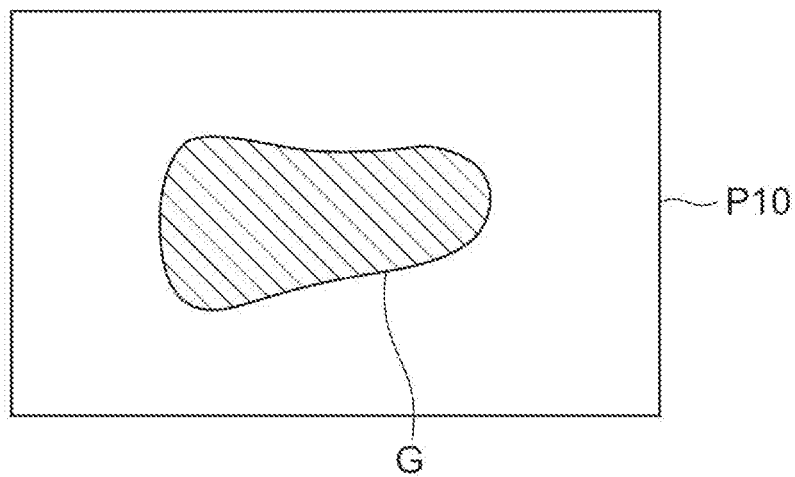
FIG. 4A is one example of a soft image.
Figure 4B:
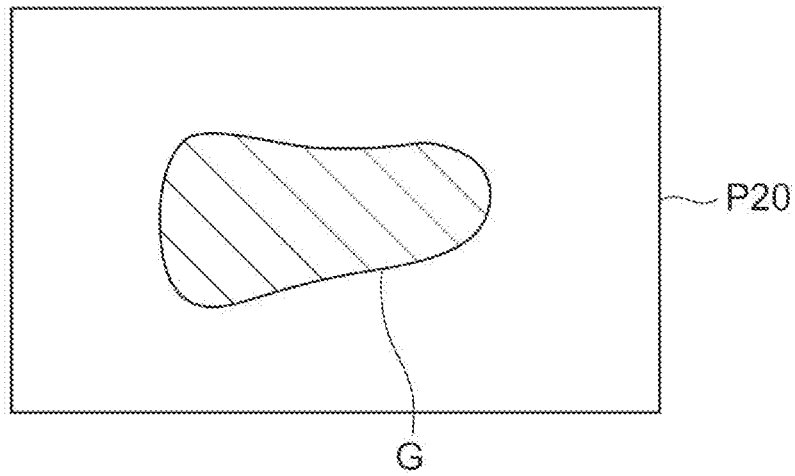
FIG. 4B is one example of a hard image.

FIG. 4A is one example of the soft image P10 generated by the above-described processing of the first image acquiring unit 101, and FIG. 4B is one example of the hard image P20 generated by the above-described processing of the first image acquiring unit 101. The soft image P10 has relatively high contrast, and is dark as a whole. Whereas, the hard image P20 has relatively low contrast, and is bright as a whole. In the present embodiment, the soft image P10 and the hard image P20 have the same width and the same height. Specifically, the soft image P10 and the hard image P20 both have pixels arranged in H rows×W columns, and each pixel is associated with a pixel value (gray value).

In the learning phase, the first image acquiring unit 101 acquires a soft image P11 and a hard image P21 in each of which a foreign matter F is disposed at a predetermined position as training data to be used by the learning unit 102 described later. The soft image P11 and the hard image P21 in which the foreign matter F is disposed at predetermined positions associated with each other (i.e., a predetermined position in the soft image P11 and a position corresponding to the predetermined position in the hard image P21) are acquired as follows, for example. Specifically, the conveyance unit 5 is caused to convey a sample in which a foreign matter F (or a test piece) is disposed at a predetermined position of an article G originally containing no foreign matter (i.e., an article G as a non-defective-product). Subsequently, the first image acquiring unit 101 generates a soft image and a hard image of the sample by the above-described processing. Thus, the soft image P11 and the hard image P21 in which the foreign matter F is disposed at the predetermined position can be obtained.

However, in this method, time is required for operation of setting (labeling) correct data (i.e., positions (pixels) where the foreign matter F is present) in training data described later. There are occasions when pixels where the foreign matter F is present cannot be identified accurately in, for example, an outline area of the foreign matter F. Furthermore, in order to obtain training data of numerous variations on the size, the position, and the like of the foreign matter F, it is necessary to prepare a sample for each variation and cause the conveyance unit 5 to convey each sample to acquire a soft image and a hard image thereof, which is significantly time-consuming.

As a method for obtaining an image in which the foreign matter F is disposed, it is possible to, while acquiring an image in an actual product line, manually check whether an article to be inspected contain a foreign matter, determine where the position is, and make a marking on the foreign matter on the image. However, it is significantly time-consuming operation. Furthermore, because mixing of a foreign matter into a sample itself does not occur frequently, collecting images indicating a foreign matter requires significantly long time.

More specifically, there are two problems that (1) it is difficult to acquire foreign matter images to be used for training data due to low frequency of mixing of a foreign matter in the first place, and (2) even if a foreign matter image can be obtained, it is necessary to manually make a marking (called annotation) indicating where the foreign matter is present. To solve these two problems, a virtual defective-product image described later is effective. This image is produced based on a non-defective-product image that can be acquired in large numbers, a virtual foreign matter can be generated by a computer, and thus the computer itself apparently knows the position of the foreign matter and can easily generate a label.

In view of this, the X-ray inspection apparatus 1 according to the present embodiment includes an image processing unit (image generating device) 50 configured to generate the virtual defective-product image (a first virtual defective-product image P112 and a second virtual defective-product image P122) in which a virtual foreign-matter image representing a virtual foreign matter is synthesized with a non-defective-product image based on an X-ray (electromagnetic wave) transmitted through an article G containing no foreign matter F. The image processing unit 50 includes the a second image acquiring unit 51, a first processing unit 52, a second processing unit 53, an information input unit 54, a hard disk drive (HDD) 55, and a storage unit 56. The second image acquiring unit 51, the first processing unit 52, the second processing unit 53, and the information input unit 54 are implemented by reading predetermined computer software into hardware such as the CPU and the RAM of the controller 10 described above, and executing the software under the control of the CPU. The HDD 55 stores (stocks) therein soft images and hard images acquired by the X-ray detector 7. The soft images and the hard images thus acquired and stored may be acquired by the first image acquiring unit 101 and the second image acquiring unit 51 described later in detail.

As illustrated in FIG. 5, the second image acquiring unit 51 acquires the first non-defective-product image P111 that is a non-defective-product image based on an X-ray in a first energy band and the second non-defective-product image P121 that is a non-defective-product image based on an X-ray in a second energy band different from the first energy band. The first non-defective-product image P111 and the second non-defective-product image P121 are acquired at least one for each. The non-defective-product image means a transmission image of an article G containing no foreign matter. The second image acquiring unit 51 generates the first non-defective-product image P111 on the basis of a detection result of an X-ray in a low energy band obtained by the first line sensor 11 of the X-ray detector 7. The second image acquiring unit 51 also generates the second non-defective-product image P121 on the basis of a detection result of an X-ray in a high energy band obtained by the second line sensor 12 of the X-ray detector 7. Hereinafter, description will be made in such an index that the gray value (e.g., a value of 0 to 255) of a pixel increases as the transmission amount of an X-ray increases.

As the first non-defective-product image P111 and the second non-defective-product image P121, non-defective-product images obtained during regular inspection may be used. Specifically, in inspection conducted on a daily basis, soft images P11 and hard images P21 of articles G that have been determined to be non-defective products may be stored, and these images may be used for the learning phase.

The first processing unit 52 changes pixel values of first target pixels PX1 that are at least one or more pixels forming the first non-defective-product image P111, thereby synthesis virtual foreign-matter images PF1 to generate a first virtual defective-product image P112 that is a virtual defective-product image. The second processing unit 53 changes pixel values of second target pixels PX2 that are at least one or more pixels forming the second non-defective-product image, correspond to the first target pixels PX1, and are located at positions corresponding to the positions of the first target pixels PX1, thereby synthesis virtual foreign-matter images PF2 to generate a second virtual defective-product image P122 that is a virtual defective-product image.

Figure 6:
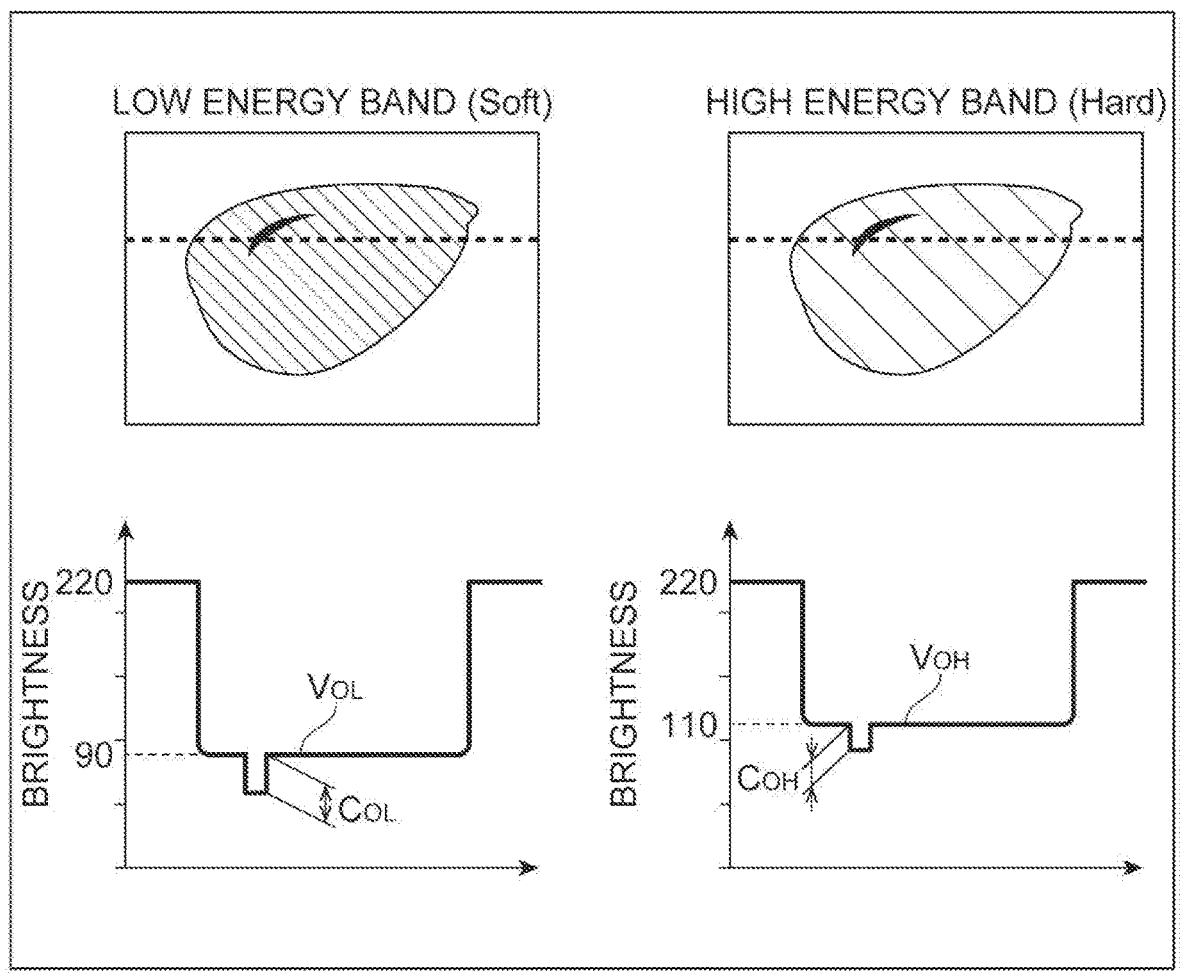
FIG. 6 is an explanatory diagram illustrating one example of a procedure of synthesis a virtual foreign-matter image upon a non-defective-product image.

As illustrated in FIG. 6, the first processing unit 52 may adjust the brightness (brightness value) in a region corresponding to an area where an article G is not present to 220 (8 bits: 0 to 255 levels of gray), for example, before changing the pixel values of the first target pixels PX1. The second processing unit 53 may adjust the brightness in a region corresponding to the area where the article G is not present to 220 (8 bits: 0 to 255 levels of gray), for example, before changing the pixel values of the second target pixels PX2. In other words, between the first non-defective-product image P111 and the second non-defective-product image P121, the brightnesses in the regions where the article G is not present may be adjusted to the same value of 220. As a result of this pre-processing, for example, it is assumed that the brightness in a region corresponding to the article G in the first non-defective-product image P111 is 90 and the brightness in a region corresponding to the article G in the second non-defective-product image P121 is 110. Herein, the regions corresponding to the article G have a uniform brightness for convenience of description, but they vary in reality.

The first processing unit 52 changes the pixel values of the first target pixels PX1 by first processing based on the attenuation factor (absorptivity) of the foreign matter F for an X-ray (electromagnetic wave), and the second processing unit 53 changes the pixel values of the second target pixels PX2 by second processing, which is processing different from the first processing, based on the attenuation factor.

The first processing is processing of reducing, within a first range $C_{OL}$, the pixel values of the first target pixels PX1 with respect to a pixel value of the first non-defective-product image P111 (e.g., the mode, the mean, the maximum, or the minimum of pixel values of pixels forming the first non-defective-product image P111). For example, when examples of the pixel values are indices representing brightness (what is called "gray value", "gray level", "brightness value", "luminance value", etc.), the first target pixels PX1 are made darker than the surroundings thereof by reducing these values.

The second processing is processing of reducing, within a second range $C_{OH}$, the pixel values of the second target pixels PX2 with respect to a pixel value of the second non-defective-product image P121 (e.g., the mode, the mean, the maximum, or the minimum of pixel values of pixels forming the second non-defective-product image P121). For example, when examples of the pixel values are indices representing brightness (gray level, brightness value, luminance value), the second target pixels PX2 are made darker than the surroundings thereof by reducing these values. As the first range $C_{OL}$ and the second range $C_{OH}$, ranges different from each other are set.

Herein, both of the first range $C_{OL}$ and the second range $C_{OH}$ are positive values, are magnitudes (absolute values) of the amount of change in pixel values of pixels to be calculated, and values having certain ranges. The first range $C_{OL}$ and the second range $C_{OH}$ are determined based on pixel values (for example, gray values of pixels corresponding to an actual foreign matter contained in an article to be inspected imaged in each of a set of a soft image (first image) and a hard image (second image)) of the respective corresponding actual images. In this case, the gray values of the article to be inspected may be determined based on the tendency of each of, not limited to one set, a plurality of sets of soft images (first images) and hard images (second images).

The lower limit of an absolute value in the second range $C_{OH}$ (either one of the first range and the second range) is set smaller than the lower limit of an absolute value in the first range $C_{OL}$ (the other of the first range and the second range). The upper limit of an absolute value in the second range $C_{OH}$ (the one of the first range and the second range) is set smaller than the upper limit of an absolute value in the first range $C_{OL}$ (the other of the first range and the second range). For example, assuming that there is a relation in which the lower limit of the first range $C_{OL}$ is smaller than the lower limit of the second range $C_{OH}$. This relation holds for upper limits, resulting in a relation in which the upper limit of the first range $C_{OL}$ is smaller than the upper limit of the second range $C_{OH}$. In the present embodiment, the first range $C_{OL}$ and the second range $C_{OH}$ are set as follows.

First range: $8 \leq C_{OL} \leq 30$

Second range: $4 \leq C_{OH} \leq 15$

Thus, the lower limit of the second range $C_{OH}$ is smaller than the lower limit of the first range $C_{OL}$, and the upper limit of the second range $C_{OH}$ is smaller than the upper limit of the first range $C_{OL}$. In this manner, the first range $C_{OL}$ and the second range $C_{OH}$ may partially overlap each other in value.

In the present embodiment, both of the upper limit and the lower limit in the second range $C_{OH}$ (one of the first range and the second range) is set based on the first range $C_{OL}$ (the other of the first range and the second range). This relation satisfies Formula (1):

$$C_{OH} = kC_{OL} \pm \delta, (0 < k < 1) \quad (1)$$

Herein, assuming that k can be set so that δ can be ignored in size. In this case, Formula (1) can be approximately expressed as Formula (2):

$$C_{OH} \approx kC_{OL}, (0 < k < 1) \quad (2)$$

The approximately equal sign indicates that difference between both sides thereof can be ignored in processing (calculation), and they may be considered to be equal hereinafter. Specific example of Formula (2), which indicates a range of a value obtained for a specific object (e.g., the article to be inspected is lean meat and the foreign matter is a bone), is expressed by Formula (3):

$$C_{OH} = (½)C_{OL}, (k = ½) \quad (3)$$

In Formula (3), a completely equal sign "=" is used. This is because δ=0.

The first target pixels PX1 and the second target pixels PX2 are selected based on shape data obtained by, for example, subjecting shape data imitating the shape of a foreign matter F stored in advance to enlargement/reduction, rotation, reversal, shear transformation, trapezoidal transformation, and the like (affine transformation and non-affine transformation, etc.). In the first image and the second image as a set, the first target pixels PX1 and the second target pixels PX2 are located in positions corresponding to each other. This is because it is assumed that the first image and the second image as a set contain the same foreign matter. The first target pixels PX1 and the second target pixels PX2 are simply considered to be in the same positions, but are not necessarily located in positions completely overlapping each other in the images because differences in positions where the first image and the second image are each imaged or differences in sizes (areas) of pixels of X-ray imaging units that have imaged the first image and the second image. Note that the first target pixels PX1 and the second target pixels PX2 always have a correspondence relation (a relation in which one pixel corresponding to the other pixel (group)).

First Processing

The first processing converts pixels for each pixel of the first target pixels PX1 selected as described above.

Specifically, the first processing converts all of the first target pixels PX1 with one common value $C'_{OL}$ that has been selected uniformly at random (with an equal probability) on condition that this value $C'_{OL}$ is included in the first range $C_{OL}$ for all of the first target pixels PX1 in the same soft image (first image) P10. The expression "converting the first target pixels PX1" herein means replacing the gray value of each first target pixel before the conversion with a gray value obtained by reducing therefrom the first value $C'_{OL}$ that is one value (absolute value) selected from the above-described first range $C_{OL}$. Consequently, the respective first target pixels PX1 are replaced by reducing the one value (absolute value) included in the range of the first range $C_{OL}$. In other words, the first processing means execution of a series of the above-described processings of darkening the first target pixels PX1 through the above-described calculation. As described above, by the first processing, a second virtual defective-product image including the first virtual defective-product image P112 can be obtained.

Herein, an individual value may be selected from the first range $C_{OL}$ for each first target pixel PX1 to be converted. In this case, the respective first target pixels PX1 are replaced by reducing individual values (absolute values) $C'_{OL}$ (that are not necessarily values equal to each other between pixels) included in the range of the first range $C_{OL}$. Although an example of a configuration has been described in which values are to be selected uniformly at random (with an equal probability), for example, the configuration may be such that the values may be selected with a probability to which weights are assigned so as to follow a normal distribution the median of which is the average of the upper and lower limits of the range (or a value based on appearance frequency in which attenuation factors are considered).

Second Processing

The second processing also converts pixels at random according to a predetermined second rule for each pixel of the second target pixels PX2 selected as described above. Herein, for an actual operational stage, whether a foreign matter is contained needs to be determined based on the first image and the second image as a set in which the same foreign matter has been imaged. Thus, also in a learning stage, a situation needs to be considered in which the same foreign matter is contained in the first image and the second image as a set. Thus, the second processing converts the second target pixels with a value $C'_{OH}$ (described later in detail) that is determined dependently based on the first value $C'_{OL}$ (in consideration of the first value $C'_{OL}$) that has been selected from the first range in the first processing. Herein, in order to express the variety (e.g., in thickness) of the foreign matter, the second processing needs to vary values (increase and reduce the values within a predetermined range in order to express the variety).

Specifically, Formula (3) (specific example of Formula (2)) is used, which indicates a relation between the first range $C_{OL}$ and the second range $C_{OH}$ that are determined individually from, for example, a sample image containing an actual foreign matter. Herein, the second range $C_{OH}$ is one-half of the first range $C_{OL}$. Thus, if a situation in which the same sample is imaged is considered, it would be understood that (the magnitude of the amount of change in gray value of) the foreign matter only needs to be expressed by reducing, from the second target pixels PX2, the second value $C'_{OH}$ obtained by multiplying by ½ the first value $C'_{OL}$ that is one value (the amount of change in gray value of each pixel) selected from the first range in the first processing. However, the variety of the foreign matter cannot be expressed only by fixed multiplication by ½ alone (e.g., between virtual foreign matters in each set, a group of foreign matters having some type of unnecessary commonality such as having a thickness that is always constant would be formed). In view of this, when the second value $C'_{OH}$ (that is a certain specific value herein) is obtained from the first value $C'_{OL}$, the first value is increased and reduced within a predetermined range to be modulated.

As a formula to be modulated, for example, Formula (4) below can be used.

$$(1-f)kC'_{OL} \leq C'_{OH} \leq (1+f)kC'_{OL}, (0<k<0, 0<f<1) \quad (4)$$

where $k=½$ as described above, and f is set to ⅕, for example. As the coefficient f, an appropriate value is determined such that the accuracy of output of the learned model described later is high. A plurality of learning (learned) models in which different coefficients f are set may be created, and more appropriate coefficient f may be determined (selected) based on comparative study results.

Thus, from Formula (4), Formula (5) below related to the second value range $C'_{OH}$ that is a range within which the second value thus modulated (hereinafter, called "modulated second value") can be obtained.

$$(⅖)C'_{OL} \leq C'_{OH}(⅗)kC'_{OL}, (e.g., k=½, f=⅕) \quad (5)$$

The range of the second value $C'_{OH}$ thus obtained (for each second target pixel PX2) is used for the second processing.

The second processing converts all of the second target pixels with one common modulated second value $C''_{OH}$ that has been selected uniformly at random (with an equal probability) on condition that this value $C''_{OH}$ is included in the second value range $C'_{OH}$ for all of the second target pixels PX2 in the same hard image (second image) P20. The expression "converting the second target pixels PX2" herein means replacing the gray value of each second target pixel before the conversion with a gray value obtained by reducing therefrom the modulated second value $C''_{OH}$ that is one value (absolute value) selected from the above-described second value range $C'_{OH}$. Consequently, the respective first target pixels PX2 are replaced by reducing the one value (absolute value) included in the range of the second value range $C'_{OH}$. In other words, the second processing means execution of a series of the above-described processings of darkening the second target pixels PX2 through the above-described calculation. As described above, by the second processing, a second virtual defective-product image including the second virtual defective-product image P122 can be obtained.

Herein, an individual value may be selected from the second value range $C'_{OH}$ for each second target pixel PX2 to be converted. In this case, the respective second target pixels PX2 are replaced by reducing individual value (absolute value) $C'_{OL}$ (that are not necessarily values equal to each other between pixels) included in the range of the second value range $C'_{OH}$. Although an example of a configuration has been described in which the modulated second value $C''_{OH}$ is to be selected uniformly at random (with an equal probability) for each second target pixel PX2, for example, the configuration may be such that the value may be selected with a probability to which weights are assigned so as to follow a normal distribution the median of which is the average of the upper and lower limits of the range or the like (or a value based on appearance frequency in which attenuation factors are considered, etc.).

As illustrated in FIG. 5, the first non-defective-product image P111 is subjected to the first processing by the first processing unit 52, whereby the virtual foreign-matter image PF1 is synthesized thereon and the first virtual defective-product image P112 is generated. The second non-defective-product image P121 is subjected to the second processing by the second processing unit 53, whereby the virtual foreign-matter image PF2 is synthesized thereon and the second virtual defective-product image P122 is generated.

In the above-described embodiment, an example has been described in which positions of pixels to be processed by the first processing and the second processing are the same between the first non-defective-product image P111 and the second non-defective-product image P121 for convenience of description. However, the distance from the X-ray emitter 6 to the first line sensor 11 and the distance from the X-ray emitter 6 to the second line sensor 12 are different. In view of this, description has been made in which the second image acquiring unit 51 performs processing of adjusting the scales between the soft image and the hard image on the basis of the ratio (L2/L1) between the distance (L1) from the X-ray emitter 6 to the first line sensor 11 and the distance (L2) from the X-ray emitter 6 to the second line sensor 12 (such that positions of pixels to be processed by the first processing and the second processing are the same between the first non-defective-product image P111 and the second non-defective-product image P121). In consideration of such difference in scale, the positions, the numbers, the sizes, and the like (positions where the virtual foreign-matter image is synthesized) of pixels to be processed by the first processing and the second processing may be set different between the first non-defective-product image P111 and the second non-defective-product image P121.

As illustrated in FIG. 3, the image processing unit 50 includes the information input unit 54 and the storage unit 56. The information input unit 54 is a unit configured to input information on virtual defective-product images (the first virtual defective-product image P112 and the second virtual defective-product image P122) to be generated by the image processing unit 50. Specifically, the information input unit 54 is a unit configured to receive inputs of the type of an article G and the type of a foreign matter F to be virtually synthesized.

The storage unit 56 stores therein synthesis processing information in which types of articles G, types of foreign matters to be synthesized with non-defective-product images, first ranges $C_{OL}$ described above, and second ranges $C_{OH}$ described above are associated with each other. The first processing unit 52 and the second processing unit 53 extract (acquire) a first range $C_{OL}$ or a second range $C_{OH}$ from the synthesis processing information on the basis of the type of a foreign matter input by an operator, for example, with the information input unit 54. In other words, the type of an article G and the type of a foreign matter to be synthesized with a non-defective-product image are selected by the operator, whereby a first range $C_{OL}$ and a second range $C_{OH}$ that are optimum are selected, so that a first virtual defective-product image P112 and a second virtual defective-product image P122 that are suitable are generated.

As for the above-described synthesis processing information, if the attenuation factor of the foreign matter F is smaller than the attenuation factor of the article G, a representative value (e.g., the average of the upper and lower limits) of the first range $C_{OL}$ is smaller than a representative value (e.g., the average of the upper and lower limits, which needs to be compared with a criterion that is the same as the representative value of the first range $C_{OL}$) of the second range $C_{OH}$. The first range $C_{OL}$ and the second range $C_{OH}$ are ranges that are not zero and positive ranges.

Herein, in order to reflect physical characteristics (absorptivity for an X-ray, which is an attenuation factor in the present embodiment) when the attenuation factor of the foreign matter F is smaller than the attenuation factor of the article G, the gray values (pixel values) of first target pixels PX1 and second target pixels PX2 need to be increased in an opposite manner to the case when the attenuation factor of the foreign matter F is larger than the attenuation factor of the article G In view of this, if the attenuation factor of the foreign matter F is larger than the attenuation factor of the article G, a database is created to have such a combination that the representative value of the first range $C_{OL}$ is larger than the representative value of the second range $C_{OH}$.

In this case also, for X-rays, the lower limit of an absolute value in the second range $C_{OH}$ (either one of the first range and the second range) is set smaller than the lower limit of an absolute value in the first range $C_{OL}$ (the other of the first range and the second range), and the upper limit of an absolute value in the second range $C_{OH}$ (the one of the first range and the second range) is set smaller than the upper limit of an absolute value in the first range $C_{OL}$ (the other of the first range and the second range). For example, assuming that there is a relation in which the lower limit of the first range $C_{OL}$ is smaller than the lower limit of the second range $C_{OH}$. This relation holds for lower limits, resulting in a relation in which the upper limit of the first range $C_{OL}$ is smaller than the upper limit of the second range $C_{OH}$.

The database described above may be not only stored in the storage unit 56 incorporated in the X-ray inspection apparatus 1 but also stored in a server or the like that can communicate via a network, for example.

In the above embodiment, an example has been described in which the type of an article G and the type of a foreign matter to be synthesized with a non-defective-product image are selected by the operator, whereby a first range $C_{OL}$ and a second range $C_{OH}$ that are optimum are selected. However, only one of the first range $C_{OL}$ and the second range $C_{OH}$ may be selected. The other of the first range $C_{OL}$ and the second range $C_{OH}$ may be calculated by a calculation formula, for example, stored separately. In other words, if one thereof can be determined based on the physical characteristics (absorptivity, which is the attenuation factor for an X-ray in the present embodiment) according to the type of an article G and the type of a foreign matter to be synthesized with a non-defective-product image, the other thereof can be calculated, and thus only one thereof may be stored.

The learning unit 102 performs learning processing of the machine learned model 103 in the learning phase described above. Specifically, the learning unit 102 prepares training data including the first virtual defective-product image P112 and the second virtual defective-product image P122 in each of which the foreign matter F is disposed at a predetermined position (see FIG. 5) and correct data representing pixels corresponding to the predetermined position (i.e., the first target pixels PX1 and the second target pixels PX2). In the present embodiment, the learning unit 102 acquires the first virtual defective-product image P112 and the second virtual defective-product image P122 generated by the image processing unit 50. Herein, as described above, the learning unit 102 does not have to acquire the soft image P11 and the hard image P21 simultaneously and parallel with real-time inspection conducted by the X-ray inspection apparatus 1. Data output from one or more X-ray inspection apparatuses 1 may be stored in an HDD (not illustrated), for example, that is a recording medium external to the X-ray inspection apparatuses 1, and the learning unit 102 may be configured to acquire images as appropriate from the HDD. The learning unit 102 also acquires the correct data by acquiring information indicating pixels included in a region occupied by a virtual foreign-matter image from the second image acquiring unit 51.

The learning unit 102 inputs the training data thus obtained (the first virtual defective-product image P112, the second virtual defective-product image P122, and the correct data) to the machine learned model 103, and thereby the machine learned model 103 learns. The learning unit 102 performs this machine learning, thereby building a learned model including a (multilayer) neural network configured to input the soft image P10 and the hard image P20 and output a foreign-matter likelihood for each pixel (i.e., the machine learned model 103 in which parameters of the neural network have been adjusted). The term "foreign-matter likelihood" herein means information representing the probability of being a foreign matter. For example, the foreign-matter likelihood of a certain pixel can be expressed by the probability (a numerical value of 0 to 1) that this pixel is a pixel corresponding to a foreign matter F (a virtual foreign-matter image in the present embodiment).

Figure 7:
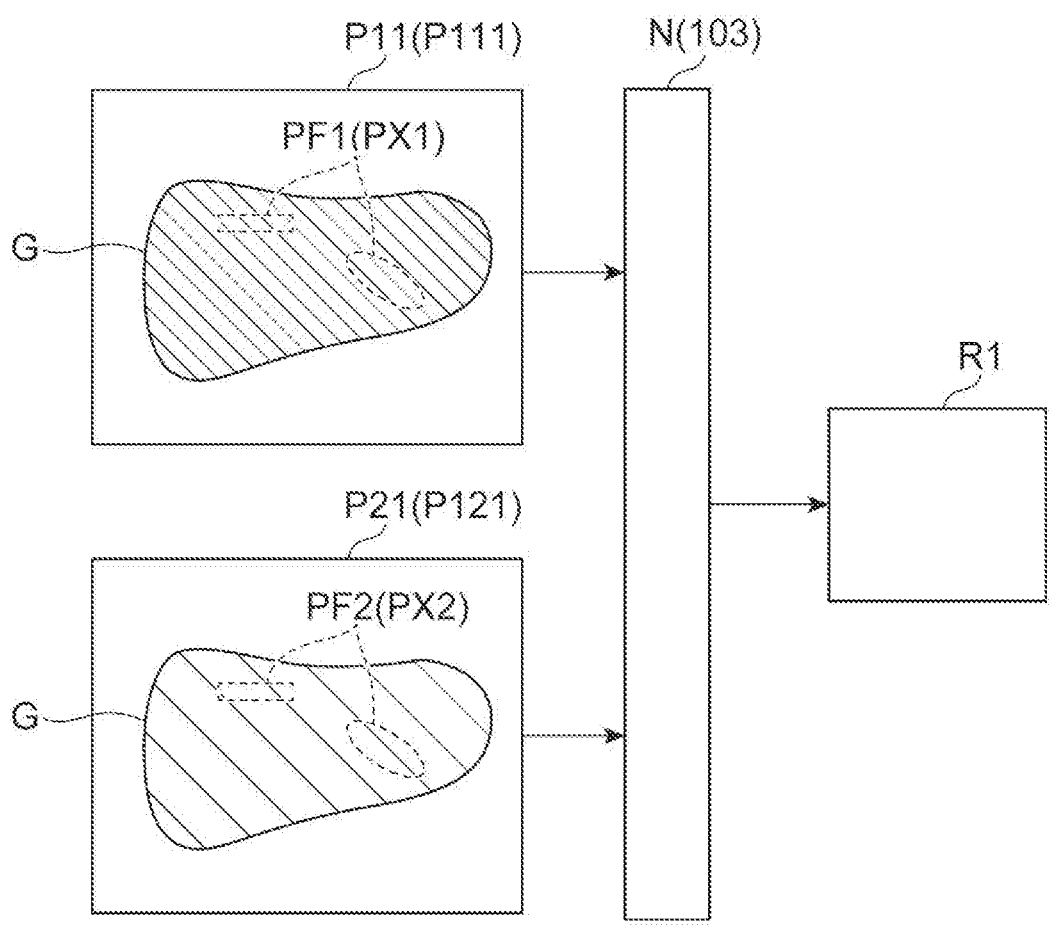
FIG. 7 is diagram illustrating one example of a machine learned model.

FIG. 7 is a diagram illustrating one example of the machine learned model 103. As illustrated in FIG. 7, as one example in the present embodiment, the machine learned model 103 includes a neural network N that is configured in advance.

The learning (i.e., adjustment of parameters of the neural network N) of the machine learned model 103 is performed as follows. Specifically, the learning unit 102 inputs the first virtual defective-product image P112 and the second virtual defective-product image P122 in the training data to the neural network N. The learning unit 102 then adjusts the parameters of the neural network N such that the degree of agreement becomes higher between correct data in the training data and pixels corresponding to a foreign matter determined based on a prediction result R1 (foreign-matter likelihood for each pixel) output by the neural network N. For this adjustment of the parameters, a known method such as backpropagation may be used.

As one example, the learning unit 102 identifies pixels that have been presumed to correspond to a foreign matter by the neural network N on the basis of the foreign-matter likelihood for the respective pixels included in the prediction result R1. For example, the learning unit 102 acquires pixels having a foreign-matter likelihood equal to or higher than a predetermined threshold (e.g., 0.5) as the pixels corresponding to the foreign matter. Meanwhile, the learning unit 102 acquires pixels having a foreign-matter likelihood lower than the threshold as pixels that do not correspond to the foreign matter. The learning unit 102 then compares the pixels corresponding to the foreign matter thus identified (or pixels that do not correspond to the foreign matter) with the correct data, thereby being able to calculate an error from the correct data of the prediction result R1. The learning unit 102 sets an optional loss function (cost function) representing such an error (loss), and uses steepest-descent method, for example, to adjust the parameters (weights) of the neural network N such that the value of the loss function decreases.

The detecting unit 104 detects a foreign matter of an article G to be inspected, using the machine learned model 103 built in the above-described learning phase. In other words, the detecting unit 104 acquires the foreign-matter likelihood (prediction result R1 output from the machine learned model 103) for the respective pixels by inputting the soft image P10 and the hard image P20 in an article G to be inspected in the inspection phase to the machine learned model 103. The detecting unit 104 then detects the foreign matter on the basis of the foreign-matter likelihood for each pixel. For example, the detecting unit 104 can detect the foreign matter mixed in the article G by identifying pixels having a foreign-matter likelihood equal to or larger than the predetermined threshold (e.g., 0.5) as described above as pixels corresponding to the foreign matter.

Figure 8:
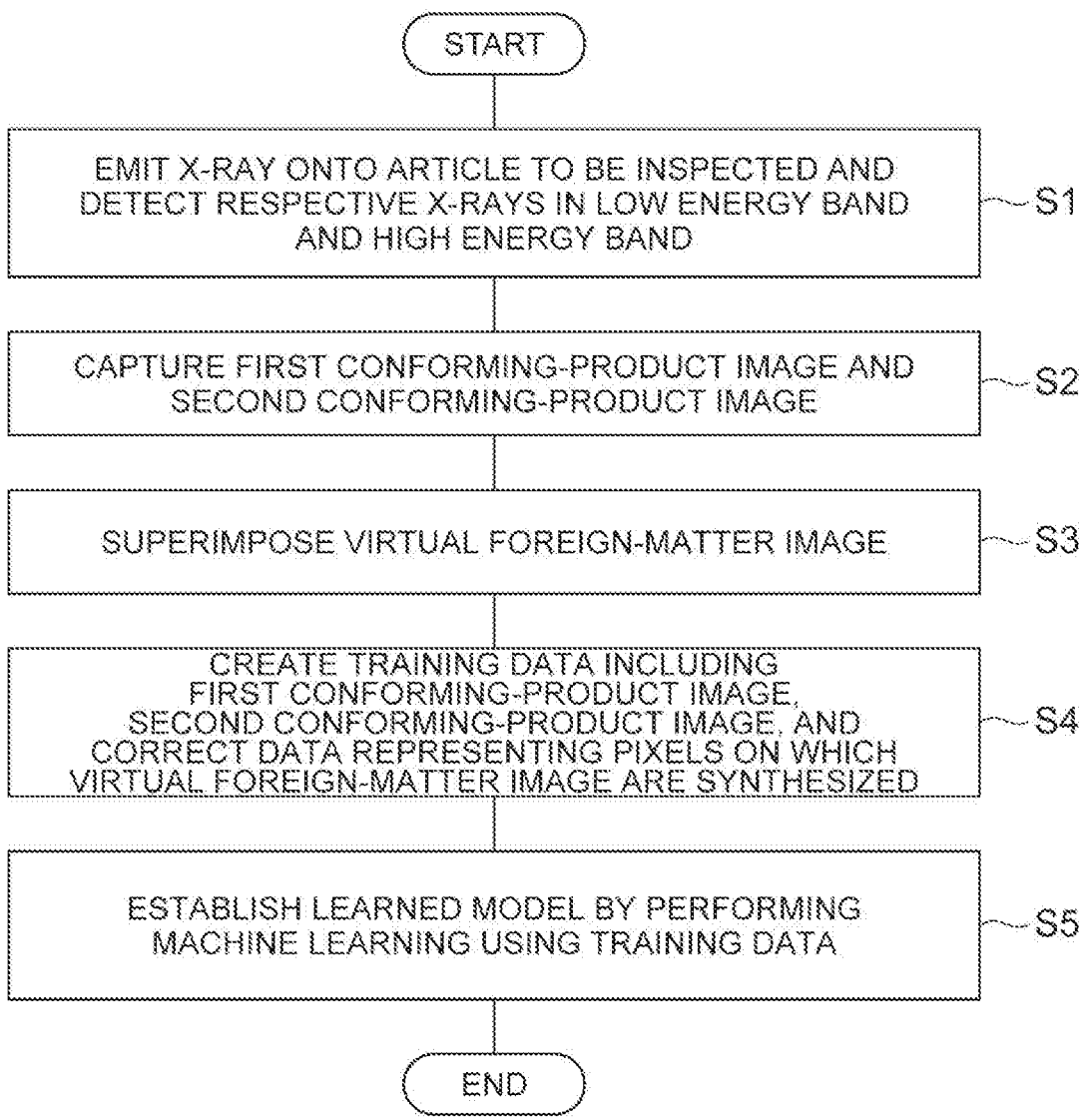
FIG. 8 is a flowchart illustrating an operation example of the X-ray inspection apparatus in a learning phase.

Referring to FIG. 8, the following describes one example of operation of the X-ray inspection apparatus 1 in the learning phase.

At step S1, an article G for creating training data is carried into the inspection region R from the carry-in conveyor 151 through the carry-in port 4a (see FIG. 1). Subsequently, the X-ray emitter 6 emits X-rays onto the article G, and the X-ray detector 7 detects the respective X-rays in a plurality of energy bands transmitted through the article G In the present embodiment, an X-ray in a low energy band is detected by the first line sensor 11 of the X-ray detector 7, and an X-ray in a high energy band is detected by the second line sensor 12 of the X-ray detector 7 (see FIG. 2).

At step S2, the second image acquiring unit 51 generates a first non-defective-product image P111 on the basis of a detection result of the X-ray in the low energy band obtained by the first line sensor 11, and generates a second non-defective-product image P121 on the basis of a detection result of the X-ray in the high energy band obtained by the second line sensor 12 (see FIG. 5).

At step S3, the first processing unit 52 synthesizes a virtual foreign-matter image for a soft image upon first target pixels PX1 of the first non-defective-product image P111, thereby acquiring a first virtual defective-product image P112 in which a foreign matter F is disposed at a predetermined position. The second processing unit 53 synthesizes a virtual foreign-matter image for a hard image upon second target pixels PX2 of the second non-defective-product image P121, thereby acquiring a second virtual defective-product image P122 in which the foreign matter F is disposed at a predetermined position (see FIG. 5).

The image processing unit 50 performs the processing at step S3 multiple times using a plurality of different virtual foreign-matter images PF on the first non-defective-product image P111 and the second non-defective-product image P121 as a set acquired at steps S1, S2, thereby generating a plurality of different pieces of training data. The image processing unit 50 also performs the processings at steps S1 to S3 multiple times for a plurality of different combinations of articles G and virtual foreign-matter images, thereby creating a plurality of different pieces of training data. At this time, it is preferable to determine set values (e.g., predetermined values such as k and f described above) such that magnitude relation of brightness (contrast of gray values) of the virtual foreign-matter images PF (the first target pixels PX1 and the second target pixels PX2) will not be reversed. However, if the magnitude relation of contrast is maintained in a tendency as a whole, the magnitude relation may be reversed for some virtual foreign matters. Because training data generally includes many images, when the mean (for example) of pixel values of the first target pixels PX1 and the mean (for example) of pixel values of the second target pixels PX2 are compared, it is preferable to set the magnitude relation of contrast such that it represents exactly the magnitude relation described above. However, there is a case in which even if the magnitude relation of contrast is reversed in only part of the training data, the resulting influence to be exerted on a final output can be ignored. In this case, the total influence is very limiting.

At step S4, the image processing unit 50 creates training data including the first virtual defective-product image P112 and the second virtual defective-product image P122 acquired at step S3 and correct data representing each of the first target pixels PX1 and the second target pixels PX2.

At step S5, the learning unit 102 performs machine learning (e.g., deep learning) using the training data created at step S4, thereby building a learned model (i.e., a machine learned model 103 in which parameters of the neural network N have been adjusted).

Figure 9:
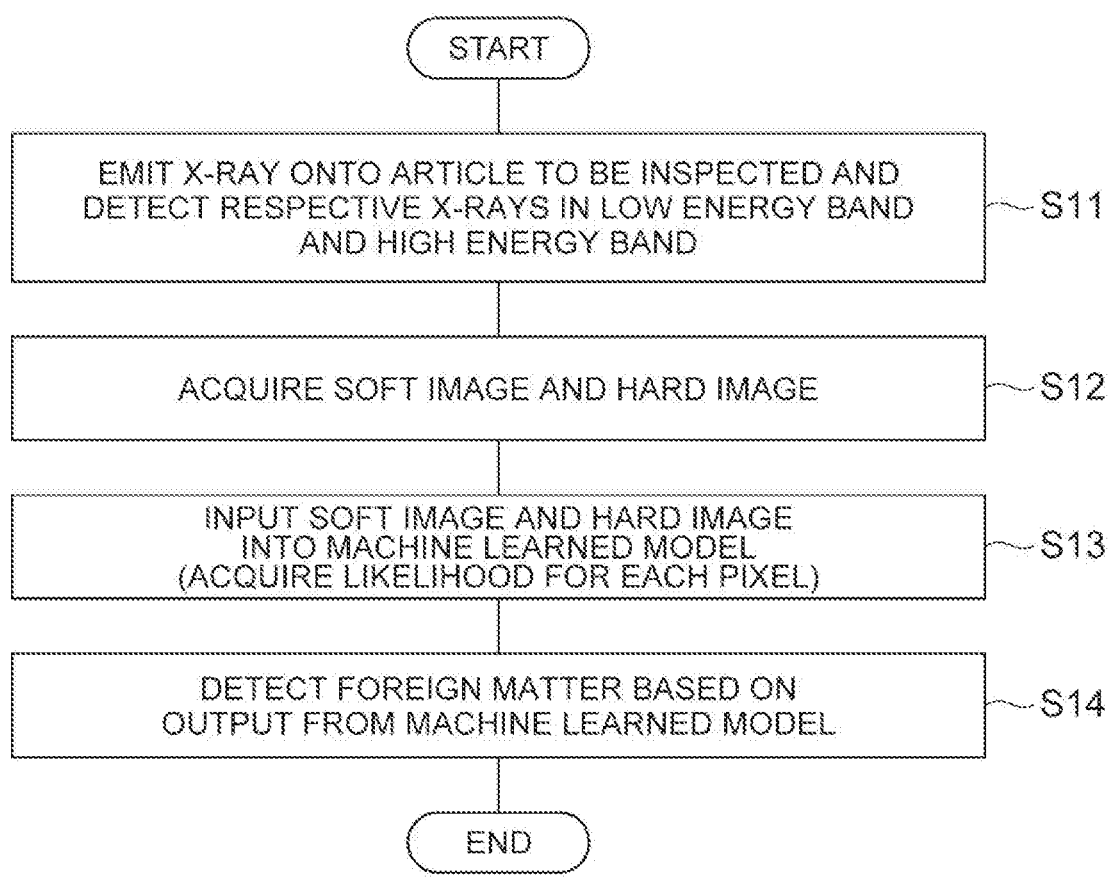
FIG. 9 is a flowchart illustrating an operation example of the X-ray inspection apparatus in an inspection phase.

Referring to FIG. 9, the following describes one example of operation of the X-ray inspection apparatus 1 in the inspection phase.

At step S11, an article G to be subjected to foreign-matter check is carried into the inspection region R from the carry-in conveyor 151 through the carry-in port 4a (see FIG. 1). Subsequently, the X-ray emitter 6 emits X-rays onto the article G, and the X-ray detector 7 detects the respective X-rays in the energy bands transmitted through the article G In the present embodiment, an X-ray in the low energy band is detected by the first line sensor 11 of the X-ray detector 7, and an X-ray in the high energy band is detected by the second line sensor 12 of the X-ray detector 7 (see FIG. 2).

At step S12, the first image acquiring unit 101 generates a soft image P10 on the basis of a detection result of the X-ray in the low energy band obtained by the first line sensor 11, and generates a hard image P20 on the basis of a detection result of X-ray in the high energy band obtained by the second line sensor 12 (see FIG. 4A and FIG. 4B).

At step S13, the detecting unit 104 inputs the soft image P10 and the hard image P20 acquired at step S12 to the machine learned model 103, thereby acquiring a foreign-matter likelihood (a prediction result R1 output from the machine learned model 103) for each pixel.

At step S14, the detecting unit 104 detects a foreign matter on the basis of the prediction result R1 output from the machine learned model 103. For example, the detecting unit 104 can detect the foreign matter mixed in the article G by identifying pixels having a foreign-matter likelihood equal to or higher than a predetermined threshold (e.g., 0.5) as pixels corresponding to the foreign matter.

According to the above-described embodiment, the first processing unit 52 and the second processing unit 53 enable a virtual foreign-matter image PF to be synthesized (contained) on the first non-defective-product image P111 and the second non-defective-product image P121 at the first target pixels PX1 and the second target pixels PX2 while reflecting the attenuation factors for the first energy band and the second energy band, respectively. This enables the virtual defective-product images (the first virtual defective-product image P112 and the second virtual defective-product image P122) based on the respective energies to be generated while appropriately reflecting the attenuation factors of the foreign matter such that the attenuation amounts of the X-rays are different depending on the energy bands.

More specifically, if a foreign matter (e.g., a bone or a metal piece) having an attenuation factor higher than that of an article G (e.g., lean meat) is wanted to be virtually synthesized, when pixel values of the article G are used as criteria, the magnitude (an absolute value, which is a value obtained by, for example, calculation similar to that of the first value $C'_{OL}$ after appropriately changing the above-described predetermined values k and f according to physical characteristics of an article to be inspected and a foreign matter) of change in pixel values of the first target pixels PX1 in the first non-defective-product image P111 is set larger than the magnitude (an absolute value, which is a value obtained by, for example, calculation similar to that of the modulated second value $C''_{OH}$ after appropriately changing the predetermined values k and f according to the physical characteristics of the article to be inspected and the foreign matter) of change in pixel values of the second target pixels PX2 in the second non-defective-product image P121. This enables the attenuation factors of an actual foreign matter F for the X-rays to be reflected.

Herein, if a foreign matter F (e.g., a void or fatty mass) having an attenuation factor lower than that of an article G (e.g., lean meat) is wanted to be virtually synthesized, a case will be described in which pixel values of the article G are used as criteria. In this case also, the magnitude (an absolute value, which is a value obtained by, for example, calculation similar to that of the first value $C'_{OL}$ after appropriately changing the above-described predetermined values k and f according to the physical characteristics of the article to be inspected and the foreign matter) of change in pixel values of the first target pixels PX1 in the first non-defective-product image P111 may be set larger than the magnitude (an absolute value, which is a value obtained by, for example, calculation similar to that of the modulated second value $C''_{OH}$ after appropriately changing the predetermined values k and f according to the physical characteristics of the article to be inspected and the foreign matter) of change in pixel values of the second target pixels PX2 in the second non-defective-product image P121 in the same manner. However, the subsequent calculation differs. Specifically, in the first processing, operation is performed in which the pixel value of each pixel in the first target pixels PX1 is replaced with a value obtained by increasing (instead of reducing) the first value $C'_{OL}$. In the second processing, operation is performed in which the pixel value of each pixel in the second target pixels PX2 is replaced with a value obtained by increasing (instead of reducing) the second value $C''_{OH}$. By these operations, the attenuation factors of the actual foreign matter F for the X-rays can be reflected.

An X-ray inspection apparatus configured to perform image processing using an image processing algorithm on an X-ray transmission image to generate a processed image and inspect an article on the basis of this processed image is known. In such an X-ray inspection apparatus, a plurality of image processing algorithms are stored in a storage unit in advance, and an optimum image processing algorithm to be used for the image processing during inspection is selected from the stored image processing algorithms and is set.

Such an image processing algorithm is executed for a sheet of an image in general, and two sheets of images cannot be input. Examples of this image processing algorithm include a genetic algorithm (GA). As for the GA, a method has been proposed a purpose of which is to, by combining existing image processings, generate (identify) image processing (image processing that is optimized by changing selection of an image processing filter to be used, appropriately changing the order of the image filtering to be used and intensities of the respective filterings) suitable for an object wanted to be inspected and a foreign matter to be found.

In this method of the GA, in order to generate (identify) the image processing, various combinations are used and are evaluated in terms of fitness whether each combination fits the purpose, and the fitness is improved by using the genetic algorithm. However, because X-ray images are generally monochrome images and such monochrome images are mainly used in existing image processings, monochrome images are still used even when the genetic algorithm is used. Thus, it is not assumed herein that two sheets of images are input to perform image processing. However, by the first processing and the second processing described above, one sheet of an image (what is called "subtraction image") in which a foreign matter is highlighted can be obtained using a known method such as subtraction from the first image and the second image that have been changed so as to virtually contain the same foreign matter. At the time of being a subtraction image, there is a possibility that a signal of noises is also included other than a signal of a foreign matter (the S/N ratio is low). If the GA is applied to this subtraction image, the foreign matter can be appropriately extracted from the subtraction image. Herein, as evaluation of the fitness, because pixels (the first target pixels and the second target pixels) corresponding to positions where a foreign matter is contained in the first processing and the second processing are already known, the above-described fitness can be calculated by comparison with pixels corresponding to the foreign matter extracted by the GA. In this manner, the above-described image processing can be adjusted such that the fitness improves, and thus the GA can be adjusted so as to be able to accurately detect a foreign matter.

In other words, with the X-ray inspection apparatus 1 according to the present embodiment, that is, an X-ray inspection apparatus having an image processing algorithm of the type described above, when an optimum image processing algorithm is set in advance, a set of a first image and a second image that are suitable for selecting the optimum image processing algorithm can be acquired.

Although an embodiment according to one aspect of the present disclosure has been described in the foregoing, the one aspect of the present disclosure is not necessarily limited to the above-described embodiment, and various modifications may be made within a scope not departing from the gist thereof.

In the embodiment, an example has been described in which the image generating device is provided as the image processing unit 50 to the X-ray inspection apparatus 1. However, the present disclosure is not limited to this. For example, the image generating device may be structured as a PC or a terminal device such as a tablet. The image processing unit 50 may be structured as a server device (image generation device) structured separately from the X-ray inspection apparatus 1. In this case, the X-ray inspection apparatus 1 and the server device are structured as a system including them, and the X-ray inspection apparatus 1 and the server device can be connected via an electronic network.

In the embodiment and the modification above, an example has been described in which the pixel values (brightness) of the first target pixels PX1 and the second target pixels PX2 are reduced from pixels in a region corresponding to the article G However, for example, when a void, fatty mass, or the like is checked as a foreign matter F, the pixel values (brightness) may be increased. If the negative-positive of the first virtual defective-product image P112 and the second virtual defective-product image P122 is reversed, the above-described relation is also reversed. The term "reverse" herein means to reverse calculation processes of increase and reduction for the first target pixels and the second target pixels. The magnitude relations for the first range, the first value, the second range, the second value range, and the like that are defined by absolute values are not reversed.

In the embodiment and the modifications above, an example has been described in which ranges of pixel values within which pixel values (brightness) of the first target pixels PX1 and the second target pixels PX2 are to be reduced from the pixels in a region corresponding to the article G are stored in advance. However, instead of the ranges of the pixel values, for example, the ratios (%) of representative values (e.g., the modes, the means, the maximums, and the minimums) of pixels in the region corresponding to the article G may be stored in advance.

In the embodiment above, one example has been described in which the inspection apparatus is the X-ray inspection apparatus 1. However, the inspection apparatus according to one aspect of the present disclosure is not limited to the X-ray inspection apparatus 1, and may be an apparatus configured to perform foreign-matter check of an article G using electromagnetic wave. The electromagnetic wave herein is an electromagnetic wave such as an X-ray, a near-infrared ray, or light. The type of an article G is not limited to a particular one, and various types of articles G can be used to be inspected. Similarly, the type of a foreign matter is not limited to a particular one, and various types of foreign matters can be used to be inspected.

Modification of the Embodiment in Infrared Inspection Apparatus

For example, in the case of an infrared inspection apparatus, a first non-defective-product image based on an infrared ray transmitted in a first wavelength band and a second non-defective-product image based on an infrared ray transmitted in a second wavelength band different from the first wavelength band may be acquired, and the first processing and the second processing described above may be performed to synthesize a virtual foreign-matter image thereon, whereby a first virtual defective-product image and a second virtual defective-product image may be generated. The infrared inspection apparatus is, for example, an apparatus configured to check whether a content as a foreign matter is caught in seal portions of a package as an article to be inspected. Infrared rays (each) transmitted through the seal portions or infrared rays (each) reflected at the seal portions are imaged each in two energy bands described later, whereby a first non-defective-product image and a second non-defective-product image are imaged.

In the infrared inspection apparatus, a procedure of setting the respective values (ranges) in the first processing and the second processing is different from above. This is because the absorptivity (attenuation factor) for an X-ray is a characteristic mainly depending on interaction between a nucleus and an electron and a photon, whereas the absorptivity for an infrared ray is a characteristic mainly depending on extension/contraction motion of molecular bonds and the fact that photons are absorbed when bond fractions are changed (what is called "spectral characteristics"). Thus, in infrared inspection, the respective values (ranges) need to be set based on logic different from that of the X-ray inspection apparatus.

Apparatus Configuration

In infrared inspection, an image generation device configured to generate a virtual defective-product image in which a virtual foreign-matter image representing a virtual foreign matter is synthesized with a non-defective-product image based on an infrared ray transmitted through an article to be inspected containing no foreign matter (pinching by a package) is considered. In this case, the image generation device includes the following respective components. Specifically, the image generation device includes an image acquiring unit configured to acquire a first non-defective-product image that is a non-defective-product image based on an infrared ray in a first energy band and a second non-defective-product image that is a non-defective-product image based on an infrared ray in a second energy band different from the first energy band. The image generation device further includes: a first processing unit configured to change pixel values of first target pixels that are at least one or more pixels forming the first non-defective-product image, thereby generating a first virtual defective-product image that is the virtual defective-product image: and a second processing unit configured to change pixel values of second target pixels that correspond to the first target pixel and are at least one or more pixels forming the second non-defective-product image, thereby generating a second virtual defective-product image that is the virtual defective-product image. The first processing unit included in the image generating device is configured to change the pixel values of the first target pixels by first processing based on the absorptivity (spectral characteristic, etc.) of the foreign matter for the infrared ray, and the second processing unit is configured to change the pixel values of the second target pixels by second processing, which is processing different from the first processing, based on the absorptivity.

The infrared inspection apparatus includes the above-described image generation device. The infrared inspection apparatus further includes: a first infrared emitter configured to be able to emit an infrared ray in the first energy band; and a second infrared emitter configured to be able to emit an infrared ray in the second energy band different from the first energy band. The infrared inspection apparatus further includes: a detector configured to detect the electromagnetic wave in the first energy band and the electromagnetic wave in the second energy band that are transmitted through an article to be inspected; and an image generating unit configured to generate a first image of the article to be inspected on the basis of the electromagnetic wave in the first energy band detected by the detector and generate a second image of the article to be inspected on the basis of the electromagnetic wave in the second energy band detected by the detector.

The following specifically describes one example of the first processing and the second processing in the image generation device included in the infrared inspection apparatus.

Principle

In a (near-)infrared ray region, a certain absorptivity is exhibited that an electromagnetic wave in a specific wavelength band depending on a foreign matter (herein, a content itself that has been pinched) is absorbed significantly more than electromagnetic waves in other wavelength bands. Herein, one of the first energy band and the second energy band is matched to a wavelength band in which absorption by a foreign matter is significantly high, and the other thereof is set to a region in which absorption by the foreign matter is less likely to occur. Specifically, when the foreign matter is a grain of rice, because the grain of rice contains much water, one of the first energy band and the second energy band is set to one first wavelength (wavelength that is commonly used for water is either one of about 970 nanometers, about 1450 nanometers, and about 1940 nanometers, and herein 1450 nanometers, for example, is used) at which absorption by water much occurs. Based on this, a first infrared emitter is disposed that is capable of emitting an infrared ray in the first wavelength band (first energy band) having a peak at the one wavelength at which absorption by water much occurs. The other of the energy band is set to one second wavelength (e.g., 1300 nanometers) that is different from the one wavelength and is in a wavelength band in which the above-described absorption by water hardly occurs such that the absorbed amount of an infrared ray by a bag or a pack into which a content is put (hereinafter, simply called "article to be inspected") is substantially the same as the absorbed amount of an infrared ray in the one wavelength set as described above. Based on this, a second infrared emitter is disposed that is capable of emitting an infrared ray in the second wavelength band (second energy band) having a peak at the second wavelength that is different from the first wavelength. The first infrared emitter and the second infrared emitter emit infrared rays onto substantially the same region, and the infrared rays emitted and transmitted or reflected are imaged by the infrared-ray imaging unit.

First Processing

The first processing is processing of causing a first non-defective-product image imaged in the first wavelength band to virtually contain a foreign matter. To begin with, the image processing unit determines first target pixels in the first processing in the same manner as in the above-described embodiment. Subsequently, a first range (upper-and-lower limit range) within which values are to be changed in the first target pixels is set. This range is set based on, in an actual defective-product image containing a foreign matter imaged in the first wavelength band, the magnitude of the absorbed amount in the pixels corresponding to the foreign matter (the absolute value of difference (the amount of reduction) of the gray value from that of an object not being the foreign matter). From the upper-and-lower limit range, a first value is selected uniformly at random (individually for each pixel, or so as to be common for all pixels), for example. The pixel value (gray value) of each first target pixel is replaced with a value obtained by reducing the first value $D'_1$ from the initial pixel value (gray value) of each first target pixel, whereby a first virtual defective-product image is obtained. Consequently, the foreign matter can be virtually contained.

Second Processing

The second processing is processing of causing a second non-defective-product image in which the same object as in the first non-defective-product image is imaged in the second wavelength band to virtually contain a foreign matter. It is assumed herein that a second range (upper-and-lower limit range) is set based on, in an actual defective-product image containing a foreign matter imaged in the second wavelength band, the magnitude of the absorbed amount in the pixels corresponding to the foreign matter (the absolute value of difference (the amount of reduction) of the gray value from that of an object not being the foreign matter). It is assumed that in can be set such that the second range multiplied by a constant in (0<m<1) substantially equals to the first range. In this case, the second value $D'_2$ satisfies $D'_2 = mD'_1$. Herein, in the same manner as in the above-described embodiment, the second value is modulated in order to express the variety of the foreign matter. Specifically, a certain one value that satisfies $(1-g)mD'_1 < D'_2 < (1+g)mD'_1$ (0<m<1, 0<g<1) is extracted, whereby a modulated second value $D''_2$ is obtained. The pixel value (gray value) of each second target pixel is replaced with a value obtained by reducing the modulated second value $D''_2$ from the initial pixel value (gray value) of each second target pixel, whereby a second virtual defective-product image is obtained. Consequently, the foreign matter can be virtually contained.

SUMMARY

By the first processing and the second processing described above, a virtual foreign matter in which an absorptivity in infrared imaging is reflected can be synthesized. The learning steps for the first virtual defective-product image and the second virtual defective-product image on which the virtual foreign matter is synthesized are the same as those in the embodiment above, and thus description thereof is omitted.

What is claimed is:

1. An image generation device configured to generate a virtual defective-product image in which a virtual foreign-matter image representing a virtual foreign matter is synthesized with a non-defective-product image based on an electromagnetic wave transmitted through an article to be inspected containing no foreign matter, the image generation device comprising:

an image acquiring unit configured to acquire a set of a first non-defective-product image and a second non-defective-product image for the same article to be inspected, the first non-defective-product image being the non-defective-product image based on an electromagnetic wave in a first energy band, the second non-defective-product image being the non-defective-product image based on an electromagnetic wave in a second energy band different from the first energy band;

a first processing unit configured to change a pixel value of a first target pixel that is at least one pixel forming the first non-defective-product image, thereby generating a first virtual defective-product image that is the virtual defective-product image; and a second processing unit configured to change a pixel value of a second target pixel that corresponds to the first target pixel and is at least one pixel forming the second non-defective-product image, thereby generating a second virtual defective-product image that is the virtual defective-product image, wherein the first processing unit changes the pixel value of the first target pixel by first processing based on an absorptivity of the foreign matter for each electromagnetic wave, and the second processing unit changes the pixel value of the second target pixel by second processing, which is processing different from the first processing, based on the absorptivity;

the first processing further reduces the pixel value of the first target pixel when the foreign matter has an absorptivity higher than that of the article to be inspected and the foreign matter is virtually synthesized and increases the pixel value of the first target pixel when the foreign matter has an absorptivity lower than that of the article to be inspected and the foreign matter is virtually synthesized, and the second processing reduces the pixel value of the second target pixel when the foreign matter having an absorptivity higher than that of the article to be inspected and the foreign matter is virtually synthesized and increases the pixel value of the second target pixel when the foreign matter having an absorptivity lower than that of the article to be inspected and the foreign matter is virtually synthesized.

2. The image generation device according to claim 1, wherein the first processing is processing of reducing or increasing, within a first range, the pixel value of the first target pixel with respect to a pixel value of the first non-defective-product image, the second processing is processing of reducing or increasing, within a second range, the pixel value of the second target pixel with respect to a pixel value of the second non-defective-product image in a similar manner to the first processing, and the first range and the second range are set to be ranges different from each other.

3. The image generation device according to claim 2, wherein a lower limit of an absolute value in either one of the first range and the second range is set smaller than a lower limit of an absolute value in the other of the first range and the second range, and an upper limit of an absolute value in the one of the first range and the second range is set smaller than an upper limit of an absolute value of the other of the first range and the second range.

4. The image generation device according to claim 2, wherein at least one of an upper limit and an lower limit in one of the first range and the second range is set based on the other of the first range and the second range.

5. The image generation device according to claim 3, wherein at least one of the upper limit and the lower limit in one of the first range and the second range is set based on the other of the first range and the second range.

6. The image generation device according to claim 2, further comprising:

an information input unit configured to receive input of a type of the foreign matter for the virtual foreign-matter image to be synthesized with the non-defective-product image; and a storage unit configured to store therein synthesis processing information in which the type of the foreign matter to be synthesized with the non-defective-product image and at least one of the first range and the second range are associated with each other, wherein at least one of the first processing unit and the second processing unit acquires the first range or the second range from the synthesis processing information, based on the type of the foreign matter input in the information input unit.

7. The image generation device according to claim 3, further comprising:

an information input unit configured to receive input of a type of the foreign matter for the virtual foreign-matter image to be synthesized with the non-defective-product image; and a storage unit configured to store therein synthesis processing information in which the type of the foreign matter to be synthesized with the non-defective-product image and at least one of the first range and the second range are associated with each other, wherein at least one of the first processing unit and the second processing unit acquires the first range or the second range from the synthesis processing information, based on the type of the foreign matter input in the information input unit.

8. The image generation device according to claim 4, further comprising:

an information input unit configured to receive input of a type of the foreign matter for the virtual foreign-matter image to be synthesized with the non-defective-product image; and a storage unit configured to store therein synthesis processing information in which the type of the foreign matter to be synthesized with the non-defective-product image and at least one of the first range and the second range are associated with each other, wherein at least one of the first processing unit and the second processing unit acquires the first range or the second range from the synthesis processing information, based on the type of the foreign matter input in the information input unit.

9. The image generation device according to claim 5, further comprising:

an information input unit configured to receive input of a type of the foreign matter for the virtual foreign-matter image to be synthesized with the non-defective-product image; and a storage unit configured to store therein synthesis processing information in which the type of the foreign matter to be synthesized with the non-defective-product image and at least one of the first range and the second range are associated with each other, wherein at least one of the first processing unit and the second processing unit acquires the first range or the second range from the synthesis processing information, based on the type of the foreign matter input in the information input unit.

10. The image generation device according to claim 6, wherein
the synthesis processing information is stored such that the type of the article to be inspected, the type of the foreign matter to be synthesized with the non-defective-product image, the first range, and the second range are associated with each other, and
the synthesis processing information is formed in such a combination that a representative value of the first range is smaller than a representative value of the second range when the absorptivity of the foreign matter is lower than the absorptivity of the article to be inspected, and is formed in such a combination that the representative value of the first range is larger than the representative value of the second range when the absorptivity of the foreign matter is higher than the absorptivity of the article to be inspected.

11. The image generation device according to claim 7, wherein
the synthesis processing information is stored such that the type of the article to be inspected, the type of the foreign matter to be synthesized with the non-defective-product image, the first range, and the second range are associated with each other, and
the synthesis processing information is formed in such a combination that a representative value of the first range is smaller than a representative value of the second range when the absorptivity of the foreign matter is lower than the absorptivity of the article to be inspected, and is formed in such a combination that the representative value of the first range is larger than the representative value of the second range when the absorptivity of the foreign matter is higher than the absorptivity of the article to be inspected.

12. The image generation device according to claim 8, wherein
the synthesis processing information is stored such that the type of the article to be inspected, the type of the foreign matter to be synthesized with the non-defective-product image, the first range, and the second range are associated with each other, and
the synthesis processing information is formed in such a combination that a representative value of the first range is smaller than a representative value of the second range when the absorptivity of the foreign matter is lower than the absorptivity of the article to be inspected, and is formed in such a combination that the representative value of the first range is larger than the representative value of the second range when the absorptivity of the foreign matter is higher than the absorptivity of the article to be inspected.

13. The image generation device according to claim 9, wherein
the synthesis processing information is stored such that the type of the article to be inspected, the type of the foreign matter to be synthesized with the non-defective-product image, the first range, and the second range are associated with each other, and
the synthesis processing information is formed in such a combination that a representative value of the first range is smaller than a representative value of the second range when the absorptivity of the foreign matter is lower than the absorptivity of the article to be inspected, and is formed in such a combination that the representative value of the first range is larger than the representative value of the second range when the absorptivity of the foreign matter is higher than the absorptivity of the article to be inspected.

14. An inspection apparatus comprising:
an emitter configured to emit an electromagnetic wave onto an article to be inspected;
a detector configured to detect an electromagnetic wave in the first energy band and an electromagnetic wave in the second energy band that are transmitted through the article to be inspected;
an image generating unit configured to generate a first image of the article to be inspected based on the electromagnetic wave in the first energy band detected by the detector and also generate a second image of the article to be inspected based on the electromagnetic wave in the second energy band detected by the detector; and
the image generating device according to claim 1.

15. A learning device comprising:
a learning unit configured to perform machine learning using training data to build a learned model, wherein
the training data includes the first virtual defective-product image and the second virtual defective-product image that are generated by the image generating device according to claim 1 and correct data representing information on the first target pixel and information on the second target pixel, and
the learned model is configured to input a first image based on the electromagnetic wave in the first energy band transmitted through the article to be inspected having a possibility of containing the foreign matter and a second image based on the electromagnetic wave in the second energy band transmitted through the article to be inspected having the possibility of containing the foreign matter and output a foreign-matter likelihood representing a probability that the foreign matter is present for each pixel.

* * * * *